United States Patent [19]
Allen et al.

[11] Patent Number: 5,422,014
[45] Date of Patent: Jun. 6, 1995

[54] AUTOMATIC CHEMICAL MONITOR AND CONTROL SYSTEM

[76] Inventors: Ross R. Allen, 408 Hainline Dr., Belmont, Calif. 94002; Gary McLeod, 13186 Scabard Pl., San Diego, Calif. 92128

[21] Appl. No.: 33,589

[22] Filed: Mar. 18, 1993

[51] Int. Cl.⁶ .................................... G05D 11/08
[52] U.S. Cl. .................... 210/743; 210/742; 210/746; 210/753; 210/96.1; 210/97; 210/89; 210/139; 210/143; 210/149; 364/499; 364/500
[58] Field of Search .............. 210/739, 742, 743, 746, 210/138, 139, 143, 85, 87, 88, 89, 90, 96.1, 97, 149; 364/497, 499, 500, 502, 510

[56] References Cited

U.S. PATENT DOCUMENTS

| | | | |
|---|---|---|---|
| 4,016,079 | 4/1977 | Severin | 210/139 |
| 4,224,154 | 9/1980 | Steininger | 210/85 |
| 4,550,011 | 10/1985 | McCollum | 210/96.1 |
| 4,648,043 | 3/1987 | O'Leary | 137/93 |
| 4,657,670 | 4/1987 | Newton | 210/139 |
| 4,688,699 | 8/1987 | Goudy, Jr. et al. | 210/138 |

*Primary Examiner*—Neil McCarthy
*Attorney, Agent, or Firm*—Pillsbury Madison & Sutro

[57] ABSTRACT

An automatic system to precisely maintain bactericidal action in a reservoir of water equipped with a recirculation system, such as a swimming pool, decorative fountain, spa, cooling water reservoir or the like. The automatic system includes: a service loop which bypasses a portion of the recirculating water past sensors which measure the pH and oxygen reduction potential (ORP) of the water and in which acid and halogen are injected by a chemical feed unit; an electronics unit for determining the injection quantity of the acid and/or halogen needed to restore pH and ORP to stored set-points, and for controlling the chemical feed unit in response to the injection time determination; and an optional telecommunication unit for reporting process control status to a remote location and allowing modification of the process parameters, selection of operating modes, and performance of diagnostic tests from the remote location. The service loop is constructed so that the acid injection results in water having a low pH flowing turbulently over the sensors and the halogen injector to keep the sensors and the halogen injector free from scale buildup and to produce data to the electronics unit from which the response characteristics of the sensors can be determined.

87 Claims, 18 Drawing Sheets

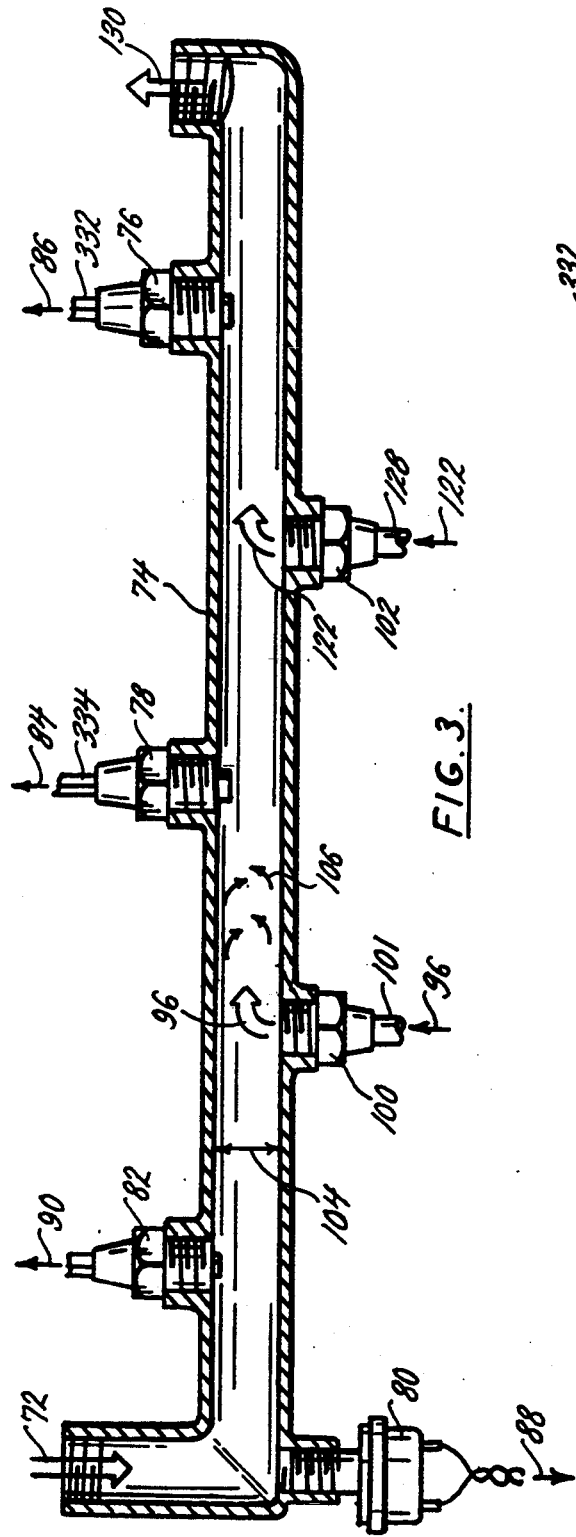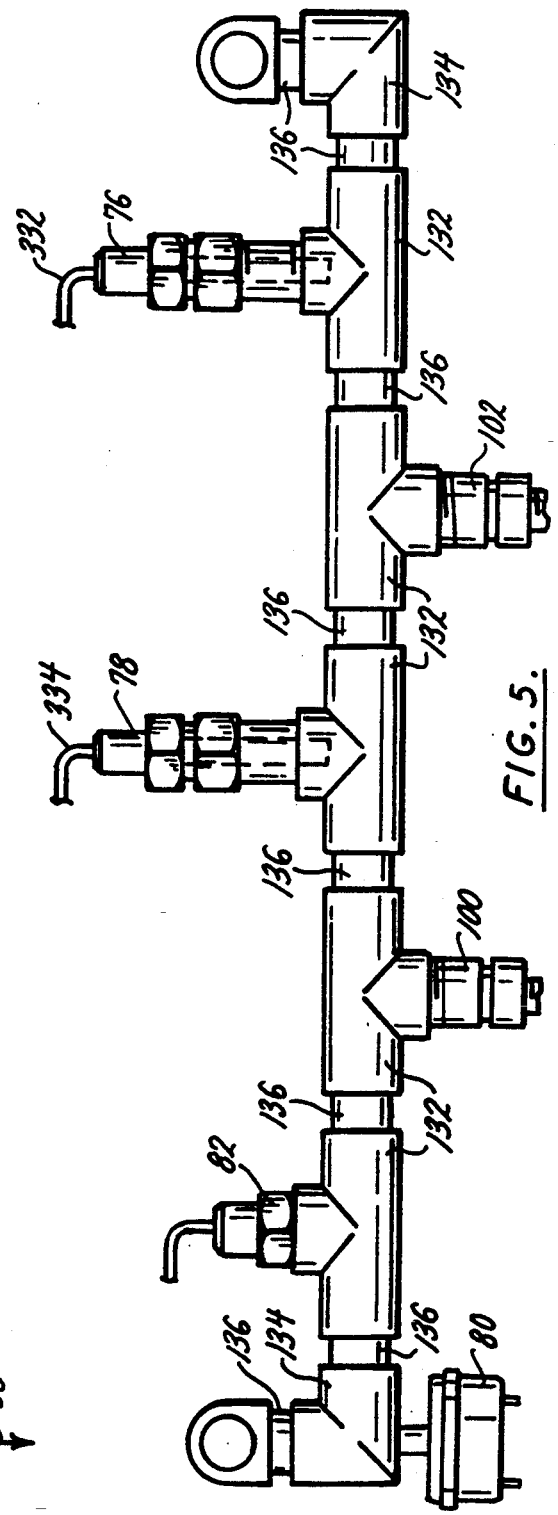

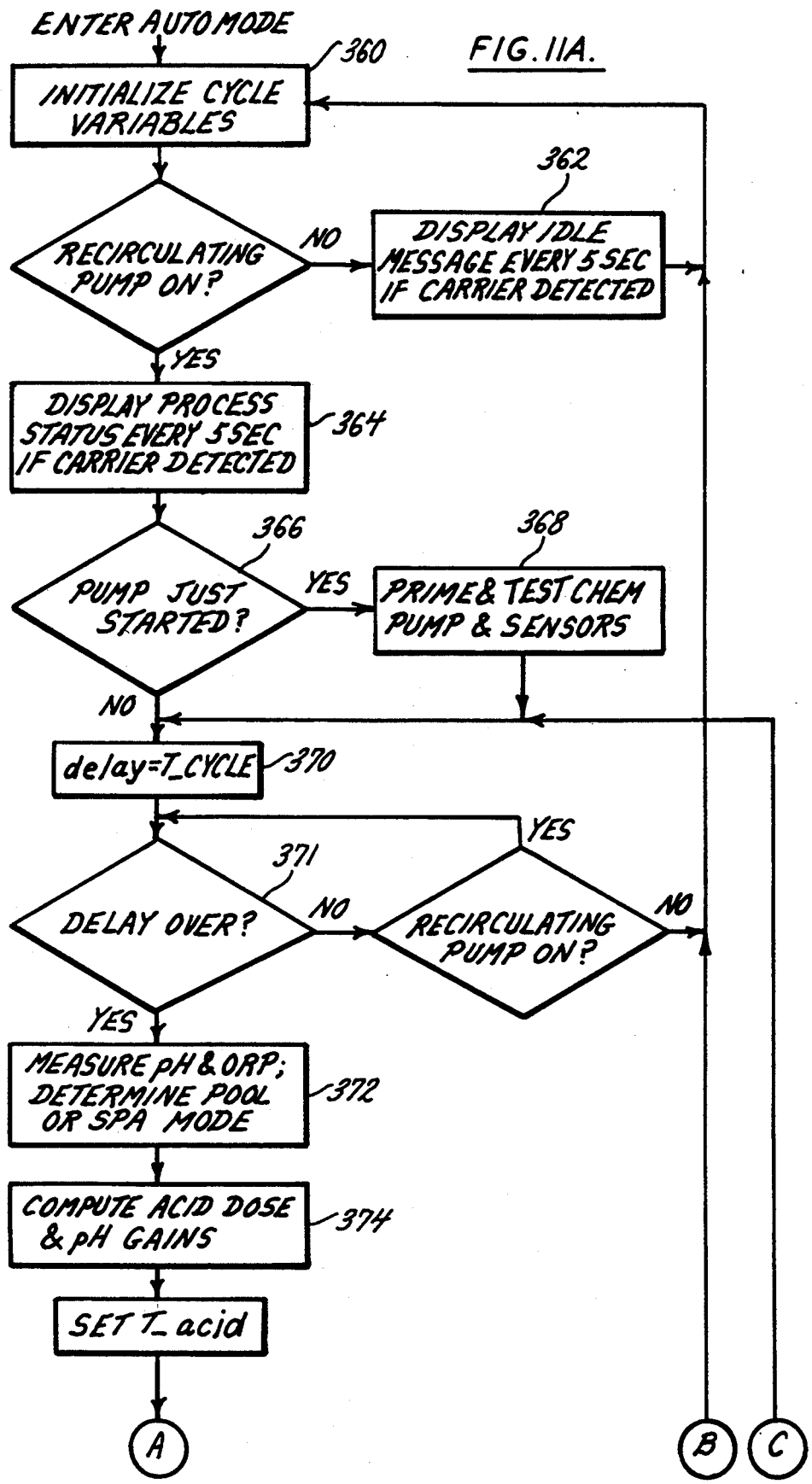

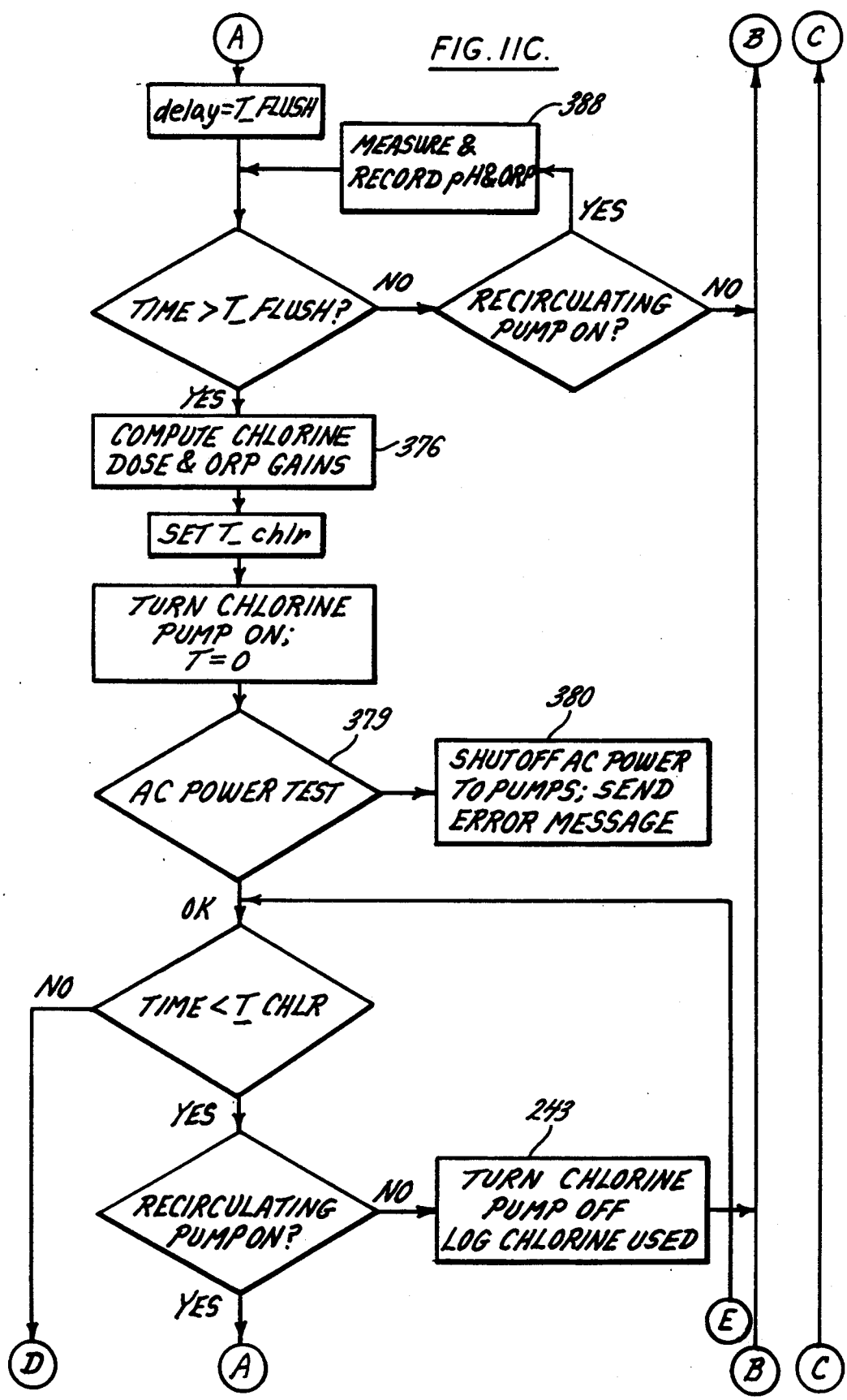

AUTOMATIC CHEMICAL MONITOR AND CONTROL SYSTEM

FIELD OF THE INVENTION

This invention relates to systems for continuously monitoring and precisely controlling the chemical balance in a reservoir of water, such as swimming pools, spas, decorative fountains, and cooling towers for air conditioning systems to prevent bacterial and algal growth and thereby maintain sanitary and pleasant conditions.

BACKGROUND OF THE INVENTION

There is a constant concern about the transmission of bacteria and viruses by means of the water in swimming pools, spas, and recirculating systems where water can create an aerosol, such as in fountains and evaporative cooling systems. *E. coli* bacteria is a major source of contamination in swimming pools, and water used in evaporative coolers is suspected as an agent for the transmission of bacteria that causes Legionnaire's disease (*Legionella pneumophila*). Typically, water in such systems is processed in a cycle which involves: storage in a reservoir; recirculation into a recirculation unit for filtering, heat exchange, quality monitoring, and chemical addition; and then return to the reservoir. The reservoir typically is open to the environment or at least to chronic sources of contamination, such as human bodies, airborne dust, insects, ornamental plant and tree debris, bird feces, and other sources of biological matter from the environment.

A reservoir of water must periodically be tested and treated with bactericidal chemicals in order to maintain sanitary conditions. This is especially important in swimming pools and spas where bathers have prolonged exposure to water-borne bacteria and viruses. It is well-known that a proper level free of halogens, typically chlorine or bromine, in concentrations of 0.1 parts per million (ppm) to 10 ppm provide strong oxidizing action which is effective in killing bacteria, see White, G. C., *Handbook of Chlorination*, 2nd Ed., Van Nostrand Reinhold, 1986. Wall, U.S. Pat. No. 4,033,871, teaches the chemistry of chlorine and bromine in swimming pool water.

Hypochlorous acid, HOCl, is recognized as the most effective bactericide of the chlorine residual fractions. In order to provide effective sanitation, the pool and spa industry typically recommends that between 1.0 ppm and 3.0 ppm HOCl be maintained in a swimming pool and between 3.0 to 5.0 ppm HOCl be maintained in a spa. HOCl in water remains in equilibrium with its dissociated form, the hypochlorite ion ($OCl^-$) and the hydrogen ion ($H^+$), and their equilibrium balance is strongly effected by the pH of the water. $OCl^-$ is significantly less effective than HOCl in bactericidal action. Therefore, pH must be controlled at proper levels to achieve a useful concentration of HOCl. Low pH (acidic) drives the equilibrium to high concentrations of HOCl, but is an irritant to swimmers as well as accelerating the dissolution of materials in the reservoir walls and the corrosion of metallic components in the water recirculation, heat exchanger, and filtration system, see McMillan, G. K., *pH Control*, Instrument Society of America, 1984. To avoid irritation, pool and spa industry guidelines suggest keeping the pH of the water between 7.4 and 7.6, preferably at 7.5, although a pH from 7.2 to 7.8 is allowable. At a pH of 7.4, the concentration of HOCl is approximately 60% and the $OCl^-$ concentration is 40%. At a pH of 7.5, the concentrations of HOCl and $OCl^-$ are about equal, and at a pH of 7.6, the HOCl concentration is about 40%. At higher pH, the concentration and hence the effectiveness of HOCl diminishes and the buildup of calcium and other salts can scale pipes, heat exchangers, and sensors.

Therefore, the pH should be maintained in the narrow range of 7.4 to 7.6 and the HOCl residual between 1.0 to 3.0 ppm in typical swimming pool applications. Several investigations have shown that the HOCl residual can be characterized by the oxygen reduction potential (ORP) of the water, but a number of factors, such as the concentration of cyanuric acid, and the type and quantity of total dissolved solids affect the correlation of ORP with ppm of HOCl. Therefore, an ORP setpoint for a control system is typically chosen by stabilizing the water at pH 7.5 and a free chlorine residual of 1.0 to 3.0, and measuring the resulting ORP. Thereafter, as the total dissolved solids increase, the control system set-point may become invalid, requiring an adjustment or a water change when the error becomes noticeable to the users.

Both pH and chlorine concentrations present significant nonlinear control problems to an automatic control system when these variables must be maintained within a narrow range for bather comfort, bactericidal effectiveness, and recirculation system reliability. Therefore, there has been a need for a control system that accomplishes consistently precise regulation to save significant expense to the operator in terms of lower maintenance costs and minimal chemical use (by avoiding over- and underdosing), as well as providing a pleasant and comfortable environment for bathers.

A number of automatic chlorine and pH control systems have been developed and marketed which uses sensors to measure the ORP and pH levels, compare the levels to preset reference values, and add an amount of chemical, usually liquid chlorine and muriatic acid. For example: Goudy, U.S. Pat. No. 4,688,699; Newton, U.S. Pat. No. 4,657,670; O'Leary, U.S. Pat. Nos. 4,648,043; 4,550,011; Steininger, U.S. Pat. No. 4,224,154; Severin, U.S. Pat. No. 4,016,079; and Maroney, U.S. Pat. No. 3,554,212 disclose automatic pool chemical control systems. The above systems, and other similar automatic pool chemicals control systems, use analog circuits and timer systems to control chemical dosage of acid and chlorine or bromine. Some include warning lights to indicate an out-of-range condition of pH and ORP.

As is apparent from the above, proper operation of the sensors is critical to proper operation of the systems. However, because the sensors are continually immersed in water, deposits form on them which over time compromise their ability to accurately measure halogen and pH levels.

Specifically, with variations in temperature, alkalinity or increases in dissolved solids like calcium carbonate in pool water, these solutes precipitate and form deposits along immersed surfaces. Although much attention has been directed to improving control systems, little if any has been directed to enhancing the performance of sensors and chemical injectors by avoiding or reversing the build up of deposits on them.

Schleimer, U.S. Pat. No. 3,592,212 addresses the problem of deposit formation in the context of a system for control of scaling (deposit formation) and corrosion in water cooling systems using heat exchange elements.

For deposit control, two approaches are suggested to control the saturation point of troublesome dissolved solids. The first is to change the water when the level of dissolved solids gets too high and the other is to add acid to the water when it becomes alkaline so that the solids remain dissolved. The acid addition is done at a location remote from the sensors and although it may retard deposit formation, it may be inadequate to avoid formation and ineffective in removing deposits once formed. Specifically, when acid in added to either the pool or spa or a portion of water removed therefrom, the concentration of acid at the point where it is added increases immediately, but the pH of the remainder of the body of water is affected much less due to the efficacy of dilution.

Discussions with swimming pool installers and maintenance personnel indicate that available control systems for automatic pH and chlorine control are unsatisfactory, generally requiring frequent, on site attention to adjust control set-points and timer duty cycles with changes in bather demand and weather, to discover system operational problems, and to verify reliable sensor operation. The available systems lack the sophistication to address several other important issues. They lack the ability to provide precise control of the chemical dose based on titration curves for each chemical, the ability to automatically adapt to changing conditions affecting chlorine demand, the ability to validate reliable operation of the pH and ORP sensors, the ability to continuously monitor the process and chemical supplies, the ability to set and adjust operating parameters remotely, and the ability to use the injected chemicals to physically maintain the sensors and chlorine injectors of the system in clean working order. The ability to remotely monitor, test, and adjust the operation of an automatic control system using a modem connected to standard telephone lines has been implemented for various types of computer and communications equipment, but such has not been applied to swimming pool and the like water monitoring systems. For example, Attallah, U.S. Pat. No. 5,119,412 discusses a method of remote switching and/or regulating an electrically operated device using DTMF telephone and modem signals and Lamp, U.S. Pat. No. 5,132,904 discloses a remotely accessible microcomputer control system for gas-and oil well heads.

SUMMARY OF THE INVENTION

The above listed needs and other features are provided by the present water monitor and control system. The present system is comprised of a digital computer implementation of an automatic chemical monitoring and control system. In the following discussion, the application to swimming pools and spas is given particular attention for purpose of example and ease of explanation but is not meant to be limiting of the invention, which is applicable to any recirculating water system exposed to bacterial contamination or where the pH must be maintained within a prescribed range..

The present invention provides an automatic chemical monitor and control system for a reservoir of water with a recirculation unit containing chemicals for bactericidal action. In an exemplary embodiment, the automatic chemical monitor and control system comprises: a chemical sensing unit for detecting the level of free halogen and pH of the water and producing signals related to those levels; a flow sensing unit for detecting the operation of the recirculation system and producing a signal indicating such operation; a chemical feed unit for feeding the chemicals into the recirculation unit and an electronics unit for determining chemical demand and controlling the chemical feed pumps of the chemical feed unit.

The electronics unit comprises: an analog circuit for receiving sensor signals from pH and ORP sensors, filtering, and limiting the sensor signals; an analog-to-digital converter for producing a digital representation of the sensor signals; a digital microcomputer with a processor, random-access memory, read-only memory, and timing means for implementing a control algorithm to calculate the appropriate doses of chemicals and produce output signals to turn on the chemical feed pumps for a period determined by pump capacity and dose; a power control unit receiving the output signals and providing power to the chemical feed pumps in relation thereto; display means for indicating feed and recirculating pump activity and the state of pH and ORP control systems; a real-time clock to provide a time of day and date reference for control processes; and means for telecommunication between the electronics unit and a remote data terminal, which may be a display and keyboard or a computer providing additional means for recording and processing data.

The chemical sensing unit includes an electrochemical pH sensor, an electrochemical oxygen reduction potential (ORP) sensor, and an optional temperature sensor that is useful for compensation of the signals from the pH and ORP sensors. The chemical feed unit includes: chemical supplies of acid and halogen compounds, preferably located so that the removal of the chemical from the supply must be against the force of gravity and against any positive pressure created by the recirculation unit; pumps or similar delivery devices; chemical injectors; and connected feed lines. The acid injector is located upstream from the pH and ORP sensors and the halogen injector and is in a location of the recirculation flow path that causes safe but relatively strong concentrations of acid to flow over the pH and ORP sensors and the halogen injector to keep them clean and provide means to test the sensors. The acid injector is used to lower and maintain the pH level of the treated water within acceptable ranges, to perturb the sensors for diagnostic purposes, and to create a controlled, localized acid wash to prevent deposition of precipitates on the pH and ORP sensors and the halogen injector; i.e., to bring the pH environment at those elements below an approximate upper value of pH 6 and preferably less that pH 4 for a length of time sufficient to remove any deposit that might have formed before it can effect the operation of such sensors or injector.

It is a principal objective of the present invention to overcome limitations of the prior art by providing an automatic monitor and control system for water in reservoirs that include a recirculating system, which regularly monitors pH and ORP, then computes and causes the appropriate chemical dose to be added to the reservoir to maintain desired bactericidal action.

It is another object of the present invention to provide means to remotely monitor the chemical balance of the water in a reservoir, the operation of pumps and sensors, and the level of chemical supplies.

It is another object of the present invention to provide means to set operating parameters of a reservoir water quality control system by communication over a standard telephone line to a remote terminal monitoring the reservoir so that need for on site visits is minimized.

It is a further object of the present invention to provide automatic means capable of adapting to the different control demands of a swimming pool with integral spa commonly found in residential settings as well as large swimming pools used in commercial applications such as hotels, apartments, and public recreation.

It is still another object of the present invention to provide maintenance and public health personnel with means to produce a time-stamped, tamper-resistant data log of water conditions and control actions in a pool over an extended period of time.

It is yet another object of the present invention to provide a chemical controller for a water reservoir with fail-safe operation, which prevents uncontrolled addition of chemicals to the reservoir in the event of an electronic or mechanical failure.

It is another object of the present invention to provide a chemical controller with maintenance features such as automatic testing of chemical pumps and sensors, automatic priming, and automatic purging of chemical pumps and fluid lines.

It is another object to provide a water monitoring and conditioning control system that uses pool chemicals in high concentration to clean and test critical system components while assuring that the chemical concentrations are reduced to safe levels before introduction of the chemically treated water back into the pool.

It is another object to provide a water monitoring and conditioning control system that can be used not only to control microorganism growth in a body of water, but also to avoid or, if necessary, reverse formation of deposits on the system's pH and halogen sensors and halogen injector.

These and other objects, features, and advantages of the present invention will be apparent to those skilled in the art after considering the following detailed description of the best mode of preferred embodiments of an automatic chemical monitor and control system together with the accompanying drawings wherein:

BRIEF DESCRIPTION OF THE DRAWINGS

FIG. 3 is an idealized cross-sectional view of the service loop portion of the present invention;

FIG. 5 is a side view of a service loop like that shown in FIG. 3 showing a physical structure therefor;

FIGS. 11A, 11B, 11C and 11D are a flowchart of the automatic mode control cycle;

DETAILED DESCRIPTION OF THE PREFERRED EMBODIMENTS

Figure 1:
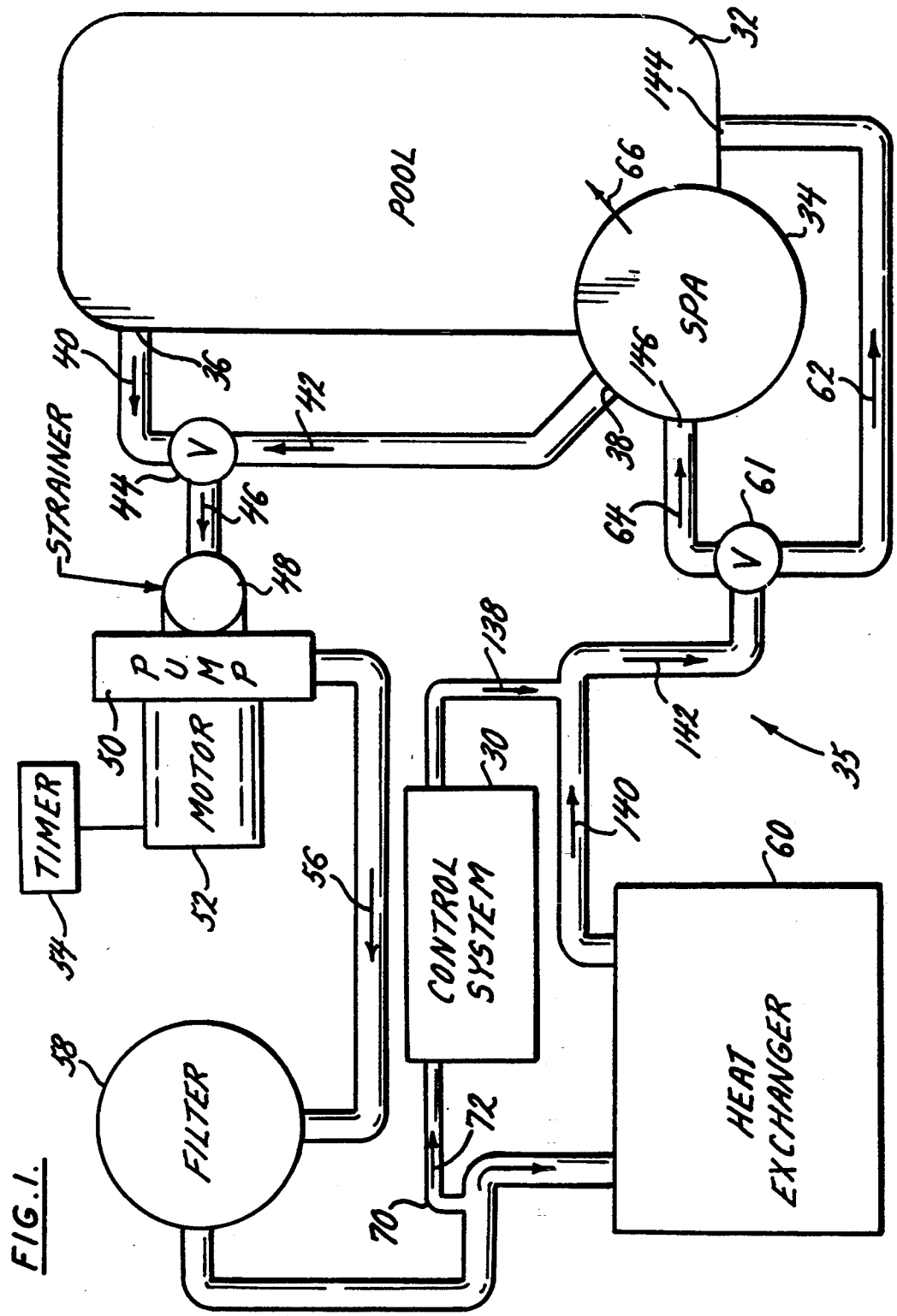
FIG. 1 is a schematic diagram of the recirculation unit for a residential swimming pool with an integral spa showing an automatic chemical monitor and control system constructed in accordance with the present invention installed therein.

Referring to the drawings more particularly by reference numbers, number 30 in FIG. 1 refers to an automatic chemical monitor and control system to maintain precise concentration of a bactericidal halogen in a swimming pool 32 to provide sanitary conditions for bathers. While the present invention will be described in connection with the swimming pool 32 with its attached spa 34, it also can be used to maintain proper bactericidal action in stand-alone spas, fountains, and cooling water reservoirs as well as the chemical balance in other bodies of water that include recirculation systems.

In the following discussion, bactericidal halogen is preferably chlorine in the form of a concentrated aqueous solution of sodium hypochlorite. Other halogens, such as bromine, may be used although chlorine has the advantage that it can be stabilized against ultraviolet solar radiation by a small amount of cyanuric acid.

The pool 32 and spa 34 are shown with a connected water recirculation system 35 including outlets 36 and 38 from the pool 32 and spa 34 respectively. The flows 40 and 42 from the outlets 36 and 38 are controlled by a suction side branching valve 44. Flow 46 is drawn through the valve 44 and a strainer 48 by a pump 50 powered by an electric motor 52. The strainer 48 removes relatively large objects such as insects, leaves, hair pins and the like from the flow 46 that might clog or damage the pump 50. Typically, the motor 52 is energized for a portion of the day determined by a timer 54 set by the pool operator. The desired time of pump operation varies with ambient temperature, debris load, and use of the pool 32 and spa 34. The motor 52 can also be energized by a thermostat (not shown) used to maintain the spa 34 or pool 32 at a constant temperature. The pump 50 elevates the pressure of the water in the recirculation system 35 and this pressurized flow 56 passes through a filter 58 that removes particulate matter too fine for the strainer 48, a thermostatically controlled water heat exchanger 60 and a return side branching valve 61. The branching valve 61 proportions the amount of flow 62 and 64 that goes to the pool 32 and spa 34 respectively. By adjusting the valves 44 and 61, the heat exchanger 60, and the timer 54, the operator can maintain the spa 34 and pool 32 at different temperatures, usually with the spa 34 much warmer than the pool 32. Under these conditions, a small overflow 66 may exist from the spa 34 to the pool 32. The temperature of the spa 34, along with a much higher density of bathers than the pool 32 provides a hospitable environment for bacterial growth. To prevent such unsanitary conditions from developing, bactericide, such as liquid chlorine in the form of sodium hypochlorite, is added to the water. As aforesaid, bactericidally-effective chlorine levels heretofore have been poorly maintained, if at all, ultimately allowing bacterial and yeast infections to be transmitted between users, when insufficient active chlorine is present, and causing skin and membrane irritation when too much is present.

The system 30 of the present invention is shown connected to the pool recirculation system 35 through a service loop 70 which bypasses a small portion 72 of the flow 56 around the heat exchanger 60, the back pressure of the heat exchanger 60 causing the bypass flow 72 to occur. The present invention could be positioned anywhere in the recirculation system 35 where a restriction will cause flow in the service loop 70. Sometimes a mere elbow in the plumbing is enough. However as will be described, the position described herein is particularly advantageous.

Figure 2:
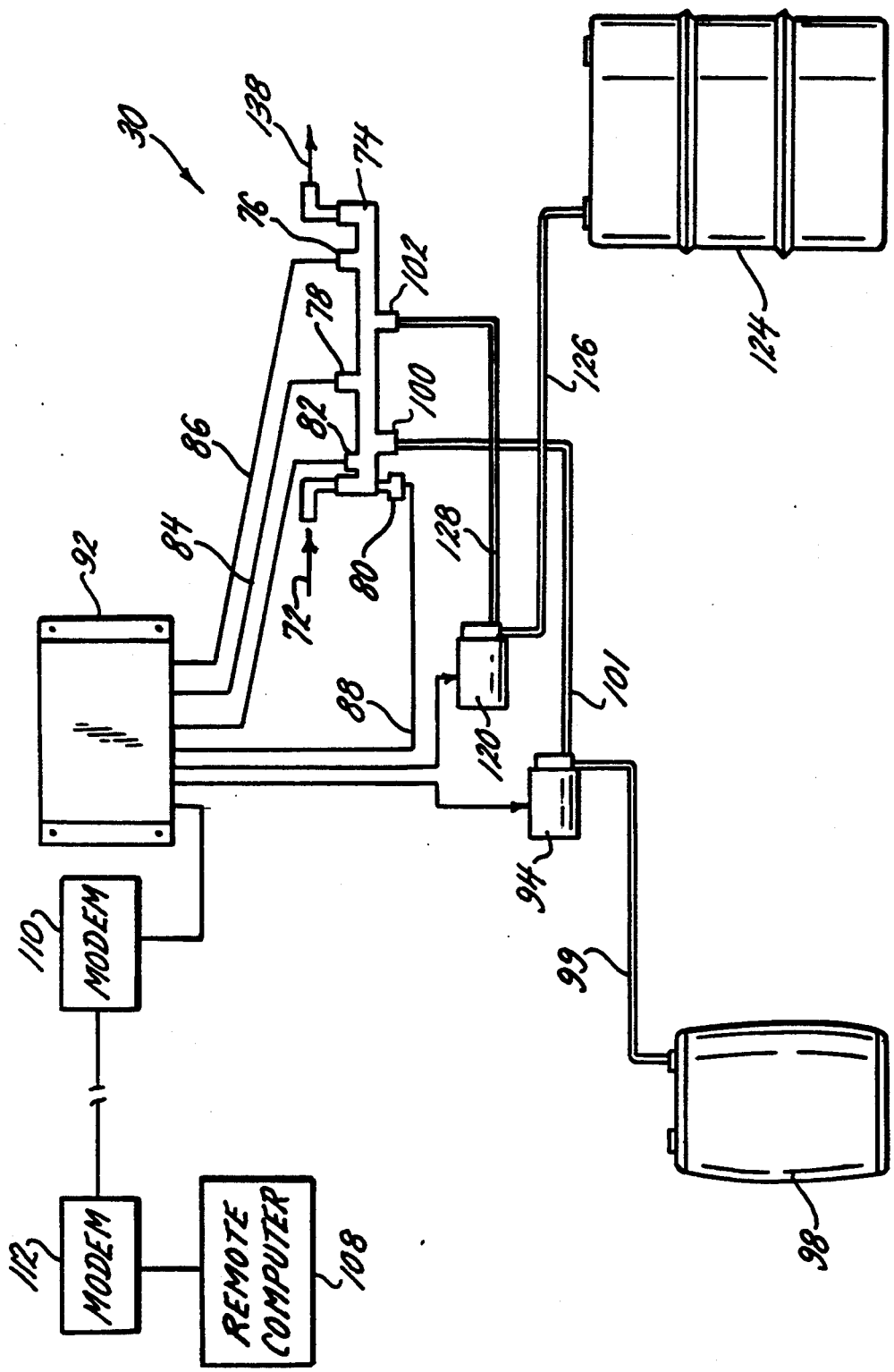
FIG. 2 is a schematic diagram of the present invention.

As shown in FIG. 2, the automatic chemical monitor and control system 30 includes a service manifold 74 in the service loop 70 through which the bypass flow 72 is fed. The bypass flow 72 is exposed to a pH sensor 76, an ORP sensor 78, a pressure switch 80, and an optional temperature sensor 82, which are mounted to the service manifold 74 and extend therein. Several suitable sensors are known to those skilled in the art and include electrochemical and photochemical cells. For use in the present invention, electrochemical cells are preferred. Particularly preferred are electrode flow cells available under the trademark SENSOREX from Sensorex of Stanton, Calif., with a "SAFEGUARD TIP" design. These products are preferred for their durable polymer body design, their use of sealed reference electrodes and their ability to withstand low pH environments.

The pH sensor 76 and the ORP sensor 78 produce millivolt-level, high-impedance output signals 84 and 86 respectively, which are functions of the concentrations of hydrogen ions and HOCl in the bypass flow 72. The pressure switch 80 closes when a pressure greater than about 3 psi is present thereby producing an output signal 88 indicating that the pump is 50 is operating. At least a 3 psi differential is normally produced by flow restrictions in the heat exchanger 60. Suitable pressure switches include the Model 3902BP switch available from Tridelta Industries, Inc. of Mentor, Ohio. The temperature sensor 82 is a solid-state device providing an output signal 90 indicative of the temperature useful in compensation of the output signals 84 and 86. In the normal residential pool use of the manifold 74 depicted, approximately 5% of the water in flow 56 passes through the manifold 72. Separating a relatively small percentage of the water in flow 56 for examination in each treatment cycle in the manifold 74 enhances the efficiency of the system 30, allow more precise control of the chemicals.

The output signals 84, 86, 88, and 90 are fed to a controller 92 which will be described in detail hereinafter. The controller 92 uses the output signals 84, 86, 88, and 90 to determine the amount of acid and liquid chlorine that needs to be added to the water to maintain the pool and spa water at a precise pH and HOCl concentration. Pool chemistry is such that the pH tends to elevate absent the addition of acid and ORP tends to lower absent the addition of chlorine. When the controller 92 senses a pH level that needs to be reduced, it first makes sure at least 3 psi above ambient is present in the manifold 74, since such is indicative of water flow. In some installations, where 3 psig cannot be developed in the manifold 74, the pressure switch 80 may be placed upstream of the filter 58, flow through the manifold 74 being verified by monitoring sensor response as will be described hereinafter. The controller 92 then energizes an acid pump 94 to pump acid 96 (FIG. 3) from an acid supply 98 by means of suction line 99 to an acid injector 100 by means of an acid discharge line 101. The acid injector 100 is located upstream in the manifold 74 from the pH sensor 76, the ORP sensor 78 and a chlorine injector 102. Preferably, the pump 94 is a constant flow or positive displacement type so that the controller 92 can command the injection of a known amount of acid 96 by energizing the acid pump 94 for a specific length of time, thereby producing a flow of acid 96. The manifold 74 is constructed with an inner diameter 104 small enough, in relation to the flow 72, that turbulent flow 106 exists within the manifold 74 to quickly mix the acid 96 with the water in the bypass flow 72. If the manifold 74 must be constructed so that the flow rates and flow cross-sections could produce laminar flow, vortex generator (not shown) or other flow mixing structures can be included in the manifold 74. The flow of acid 96 is diluted by the turbulent flow 106 into a low pH flow that keeps the sensors 76 and 78 clean and prevents any solids buildup from occurring in the vicinity of the chlorine injector 102. When mixed in the return flow 62 or 64, the pH is high enough to avoid corrosion of components in the recirculation system and to be safe for bathers exposed directly to the return flow 64 or 62, respectively. An alternate configuration to that shown in FIGS. 3 and 5 would move the chlorine injector upstream of the ORP sensor (not shown).

The intermittent acid flow should drive the pH sensor output signal 84 to indicate a low pH value and the ORP sensor output signal 86 to indicate a high ORP value, which then should gradually recover to normal levels after the flow of acid 96 has ceased. If the pH sensor and ORP sensor output signals 84 and 86 do not respond as expected, the controller 92 determines there is a system fault, and notifies maintenance personnel. Although the notification can be made pool side, the notification may take place at a remote computer terminal 108 connected to the controller 92 by suitable means such as the modems 110 and 112 shown.

The controller 92 also energizes a chlorine pump 120 which pumps liquid chlorine 122, usually sodium hypochlorite (NaOCl), from a chlorine container 124 through a suction line 126, a discharge line 128, and the chlorine injector 102 into the turbulent flow 106. Like the acid pump 94, the chlorine pump 120 preferably is of the constant flow or positive displacement type so that the controller 92 can inject a known amount of chlorine 122 by operating pump 120 for a specific length of time. The chlorine injector 102 is located downstream from the ORP sensor 78 but upstream from the pH sensor 76. This allows the response of the pH sensor 76 to chlorine injection to indicate to the controller 92 that a commanded chlorine injection has been successful or an uncommanded chlorine or acid injection has been made indicating a system fault.

Figure 4A:
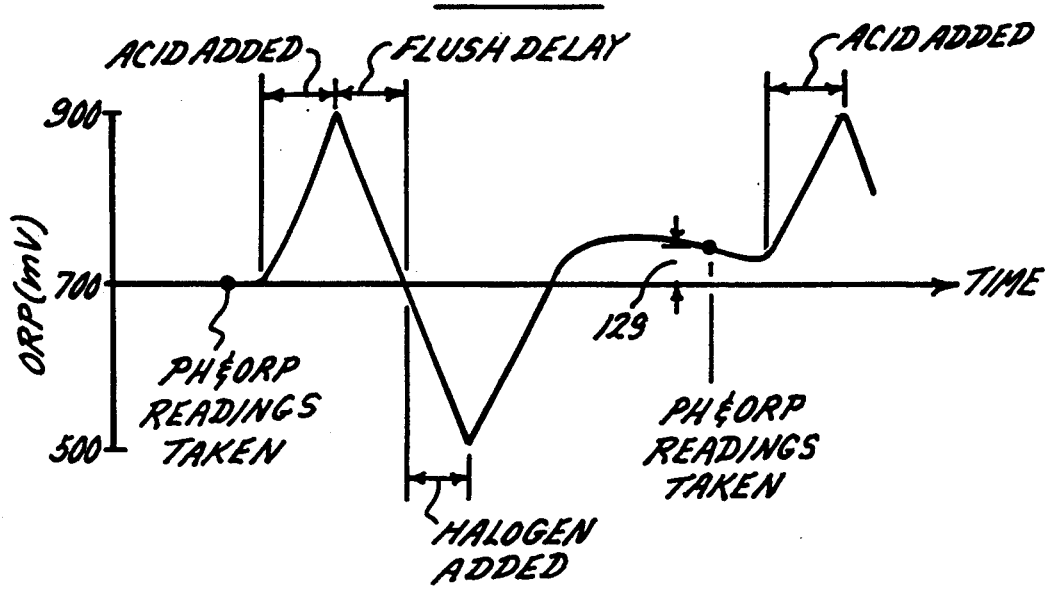
FIGS. 4A and 4B are graphs of ORP sensor response versus time for different service loop configurations.

FIG. 4A shows the response of an ORP sensor 78 located downstream of the acid and liquid halogen injectors 100 and 102 in the manifold 74. For illustrative purposes, it is assumed the water entering the manifold 74 has constant ORP. pH and ORP readings are made as shown with both acid and liquid chlorine dosages computed before the injection of acid 96. A rapid increase in ORP is seen as acid flows over the ORP sensor 78, and the response begins to decay to the ORP of the entering stream during the flush delay. ORP is then driven to a low value while liquid chlorine 122 flows over the ORP sensor. After chlorine injection stops, ORP rises to a value above that of the entering stream and then slowly decays back to the incoming ORP. If the cycle time for this manifold is chosen to be less than about 10 minutes, the ORP measurement for the next control cycle will be erroneously high as shown by the offset 129, which reduces the dose of chlorine from the actual requirement.

Figure 4B:
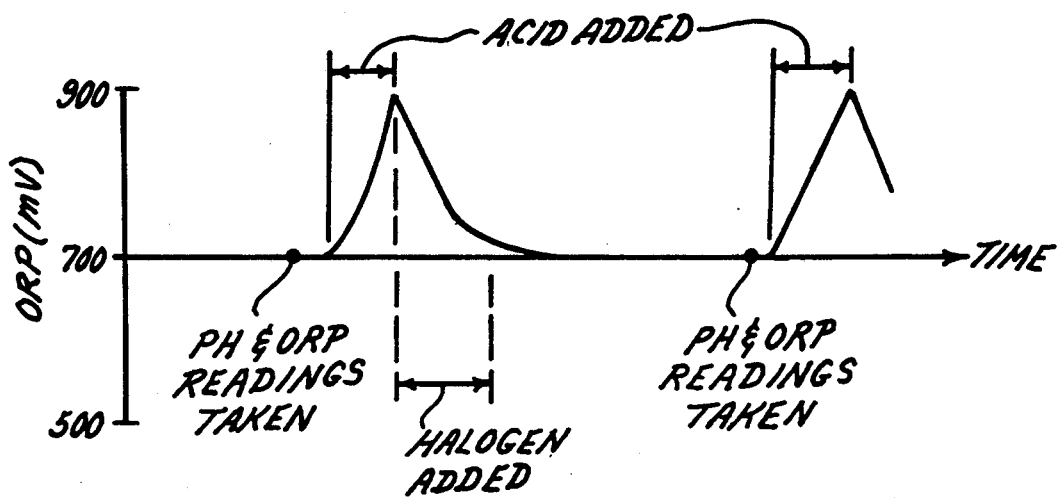

In FIG. 4B, the present ORP sensor 78 is located upstream of the liquid chlorine injector 102 and downstream of the acid injector 100. This configuration of the manifold 74 gives the ORP sensor 78 the benefit of exposure to acid 96 to remove scale deposits while providing improved speed of response. As can be seen, when pH and ORP are measured for the second control cycle, the offset 129 in FIG. 4A is not present and the ORP measurement is accurate.

In an alternative embodiment of the system 30, the pressure switch 80 may be replaced by a liquid flow sensor of the flapper or impeller type, which is activated by flow and is magnetically or optically coupled with a transducer to produce a signal indicating water flow in the manifold 74. Typically, a flapper sensor would produce a binary signal related to the position of the flapper in the flow and the impeller sensor would produce a pulse train proportional to its rotational speed. Either type of signal may be processed by the controller 92 to produce an indication of recirculating pump discharge flow using the same electronics as for the pressure switch 80. Note that the flow of the water is sensed rather than actual pump operation. This allows the recirculation pump 50 to be independently controlled without requiring electrical connection to the system 30.

Another alternative embodiment places the pressure switch 80 between the pump 50 and the filter 58. This has been found to be necessary in some test installations where the pressure in the manifold 74, determined by the pressure developed by flow through heat exchanger 60 is too close to ambient pressure for reliable water flow determination, typically less than 3 psi.

As can be seen in FIG. 5, the manifold 74 is easily constructed from standard T fittings 132, elbow fittings 134 and lengths of flexible or rigid tubing 136. The sizes of fittings 132 and 134 and flexible tubing 136 are selected among several common parts to adjust the flow through manifold 74 to between 0.5 and 3 gallons per minute, which has proved in tests to be an appropriate range for most pool applications. The tubing 136 and fittings 132 and 134 may be formed of any material approved for use with the treatment chemicals by the National Sanitation Foundation, but will preferably be formed of polyvinyl chloride (PVC) or a Acrylonitrile butadiene styrene (ABS) plastic.

There are two major requirements for the rate of flow through the manifold 74. The flow 72 should be less than 5 gallons per minute (gpm) and preferably less than 2.5 gpm to optimize the detection of pH levels therein, and the flow should be turbulent as aforesaid, that is flowing at a Reynolds number of greater than 2000, to assure proper mixing of the chemicals in the manifold 74. For that reason, the inner diameters of the tubing 136 and the fittings 132 and 134 and any connecting components may be determined by the equation:

$$N_R = vrp/n$$

where v is the liquid velocity, r is the radius of the in-line components, p is the density of the flow 72, and n is the viscosity of the flow 72. Given a desired $N_R$ (Reynolds number) of >2,000 and known values for v, p and n, useful values for r can be calculated.

The outflow 138 from manifold 74 is combined with the untreated flow 140 through the heat exchanger 60 into the return flow 142 controlled by the valve 61. Since the acid 96 and liquid chlorine 122 are periodically discharged into pool 32 or spa 34 and allowed to mix, it is an important consideration in system design for swimming pools and spas to assure that these chemicals are sufficiently dilute in the return flows 62 or 64 so as not to present a health risk to a person near the return ports 144 or 146. Therefore, the volume flow rates of the acid pump 94 and liquid chlorine pump 120 must be limited with respect to the volume flow rate of the recirculation system 35 to assure sufficient dilution of injected chemicals in the recirculation system 35.

The controller 92 allows chemical injection only when water is flowing through the manifold 74 to dilute the chemicals and carry them into the pool 32 and 34. When no water is flowing, the controller 92 is maintained in a standby mode waiting for water flow to commence. In this mode, no sensor readings are made and no chemical injections are commanded in response to deviations of pH and ORP from their set-points.

The present system 30 is advantageous with respect to several commercially available automatic chemical controllers in that it requires no electrical connection to the recirculating pump motor 52 or to the timer 54 which controls the motor 52. This provides electrical isolation and avoids the need to sense a 120VAC signal. Some commercial pH and chlorine control systems derive the electric power for their control unit from the electricity applied to the recirculating pump motor, and activate with such motor. Others just drive a control signal for voltage across the pump motor. In any case where a signal is derived from the voltage across the recirculating pump motor, the possibility exists for a false determination of water flow. Should the recirculating pump deprime or for some other reason not produce water flow when power is applied to the pump motor, chemicals can be discharged into the pool or spa without dilution by the recirculating flow and can present a hazard to users. Common reasons for a no flow condition include failure of a coupling or bearing within or between the recirculation pump and motor, fouling of the recirculation pump, and clogging of the strainer or the filter.

Figure 6:
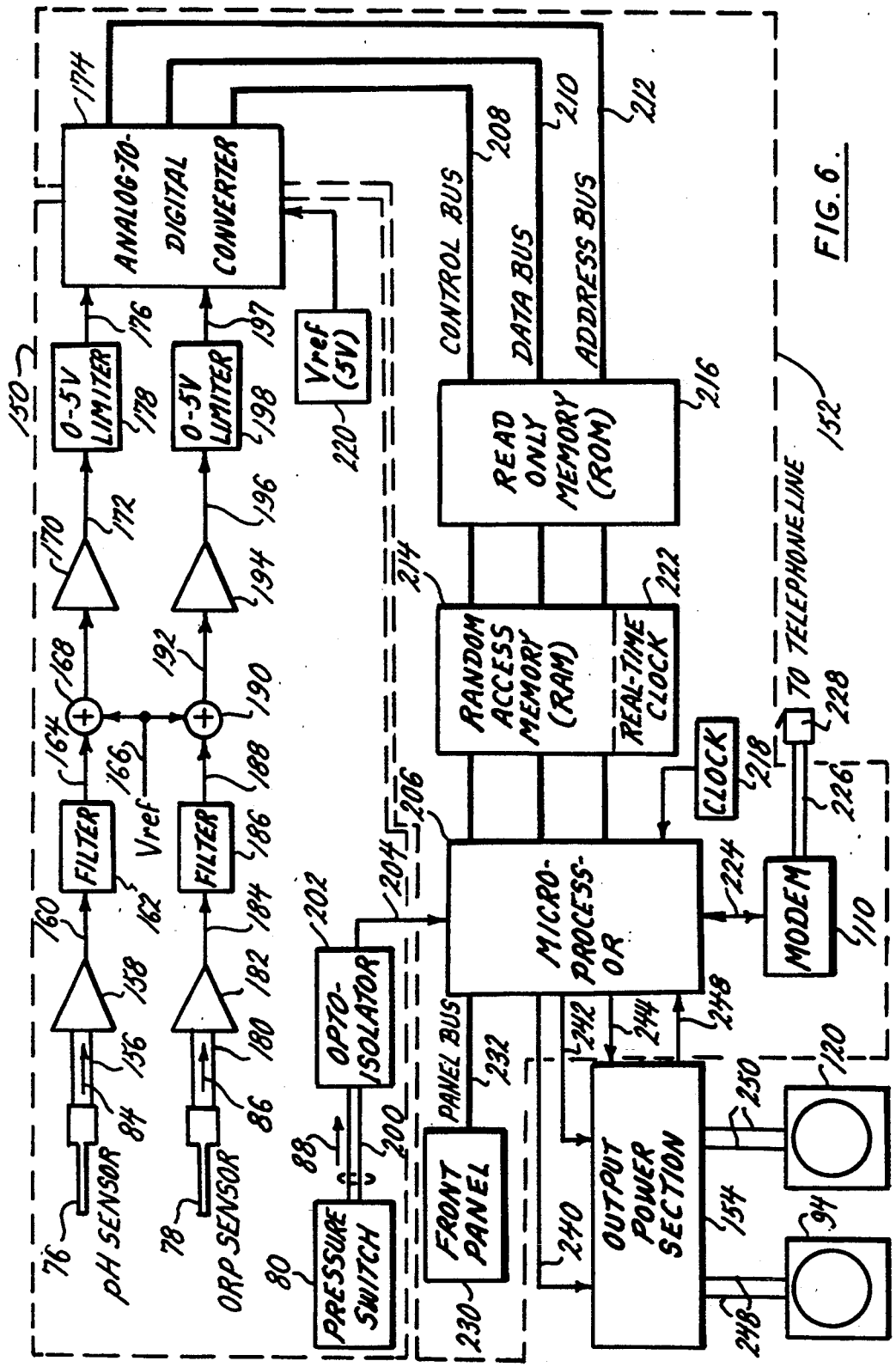
FIG. 6 is a block diagram of the electronics of the present invention.

FIG. 6 shows a block diagram of one embodiment of the controller 92. This embodiment does not include the temperature sensor 82 and provides 120VAC energization of the acid and chlorine pumps 94 and 120. An alternate embodiment, to be disclosed hereinafter, incorporates the temperature sensor 82 and provides 5VDC control outputs to pumps 94 and 120. The controller 92 of FIG. 6 includes an analog input section 150, a digital computer section 152, and an output power control section 154.

The analog input section 150 buffers and filters the output signals 84 and 86 of the pH and ORP sensors 76 and 78, provides gain and offset, and limits these signals for analog-to-digital conversion. All amplifiers in the analog input section 150 can be commercially available integrated operational amplifiers. +12VDC and −12VDC regulated power supplies, not shown, are used to power the operational amplifiers.

The pH sensor 76 is connected through shielded coaxial cable 156 to the input of a high-impedance, unity-gain buffer amplifier 158. The amplifier 158 should have an input impedance greater than $10^{12}$ ohms to minimize voltage offset due to currents through the pH sensor 76. The output 160 of the amplifier 158 is filtered by a low-pass filter 162 with a upper cutoff at approximately 1 Hz. This filters out fluctuations in the pH signal 84 due to flow instabilities within manifold 74 and rejects 60 Hz signals. The output 164 from the filter 162 is offset by summing with a stable voltage reference 166 in a summing circuit 168 and multiplied by a constant in an amplifier 170. At the output 172 of the amplifier of 170, a useful dynamic range for pH measurements, for example 6.8 to 8.0, is represented by a signal of 0.0V to 5.0V for analog-to-digital conversion by an analog to digital converter (ADC) 174. The ADC 174 is protected from out-of-range pH signals by limiting its input 176 from 0 to 5V using limiter 178.

The output signal 86 of the ORP sensor 78 is connected through a shielded coaxial cable 180 to the input of a second high-impedance, unity-gain buffer amplifier 182. The amplifier 182 also should have an input impedance greater than $10^{12}$ ohms to minimize voltage offset due to currents through ORP sensor 78. Amplifiers 158 and 182 preferably are isolation amplifiers such as the AD 202A or AD204A produced by Analog Devices, so that they isolate the pH and ORP sensors 76 and 78 from power supply faults, ground loops, and galvanic currents. The output 184 of the amplifier 182 is filtered by a low-pass filter 186 with a upper cutoff of approximately 10 Hz, since the filter 186 is primarily for rejecting stray 60 Hz signals. The output 188 of filter 186 is offset by summing with the stable voltage reference 166 in a summing circuit 190. The output 192 of the summing circuit 190 is multiplied by a constant by amplifier 194 to produce an output 196 having a useful dynamic range for ORP measurements, for example 400 mV to 900 mV, represented by a signal of 0.0V to 5.0 V for analog-to-digital conversion by the ADC 174. The ADC 174 is protected from out-of-range ORP signals 196 by limiting the signal 197 from 0.0 to 5.0 V using limiter 198. Commercially available and inexpensive 8-channel ADCs may be obtained for 8-, 10-, or 12-bit resolution compatible with 8-bit data buses. An example is the ADC0808 from National Semiconductor.

The output signal 88 from the pressure switch 80 is connected by a shielded two-wire cable 200 to an optoisolator 202. A conventional power circuit, not shown, provides a source of current at 5VDC for the switch 80, limited to about 20 milliamps. When pressure switch 80 is closed, this current signal 88 in the cable 200 illuminates a light-emitting diode within optoisolator 202 which allows a phototransistor therewithin to conduct, pulling the voltage on line 204 close to ground potential. This condition is used by a microprocessor 206 to detect closure of the pressure switch 80 while isolating it from any stray voltages appearing in signal 88.

The digital computer section 152 is implemented by means of a conventional 8-bit or 16-bit microprocessor architecture. In a preferred embodiment, an 8-bit architecture based on the Intel 8051 family of embedded controllers is used. This architecture includes the microprocessor 206 communicating on control bus 208, data bus 210, and address bus 212 with nonvolatile RAM (random access memory) 214 and ROM (read-only memory) 216. Preferably, the RAM 214 stores at least 8 Kbytes of data and the ROM 216 stores at least 64 Kbytes of program code and constants. A crystal oscillator 218 provides a clock frequency of 11.0592 MHz to microprocessor 206. Not shown is a conventional regulated 5VDC power supply, and a watchdog circuit which resets the microprocessor 206 unless it receives a pulse at least once per second from an output pin of the microprocessor 206. This pulse is generated by the control program and serves to protect the system 30 against an out-of-control microprocessor 206. The ADC 174 is a memory-mapped peripheral to microprocessor 206 and is connected by the control, data, and address buses 208, 210, and 212, respectively, so as to appear as a memory location whose contents contain the 8-bit result of the analog-to-digital conversion. A stable 5.0 V reference 220, derived from the +12VDC analog power supply, is used for ADC 174.

A real-time clock 222 provides a time stamp of time of day in seconds, minutes, and hours along with day, month, and year. A preferred embodiment integrates the real-time clock 222, the random-access memory 214, and an auxiliary power source (not shown) to provide nonvolatile random-access memory for the system 30. Nonvolatile storage of system configuration data in RAM 214 is essential to this application because service personnel customarily turn off all electrical power to the pool 32 while it is being serviced to prevent electrical shock and accidental operation of the recirculating pump motor 52. The controller configuration data in RAM 214 must remain during such time when no power is supplied to the controller 92, and the real-time clock 222 must keep time during any power outage. An example of a nonvolatile 8 Kbyte RAM integrating an auxiliary power source (lithium cell) with a real-time clock is the Dallas Semiconductor DS1243Y.

The modem 110 provides the controller 92 with remote teleservicing and data logging capability. The modem 110 is connected to the microprocessor 206 by a modem bus 224 which carries transmitted and received serial data, control and status signals. The modem 110 is connected to a standard telephone line by means of a cable 226 terminating in an RJ-11 jack 228. The modem 110 preferably is a self-contained, integrated unit with an FCC approved Data Access Arrangement.

A front panel 230, connected to microprocessor by panel bus 232, provides system status, alarms, and a keypad for user input. Many arrangements are possible including light-emitting diode and liquid crystal displays singly or in combination, single or multiple pushbuttons, and other input and output means.

Figure 7:
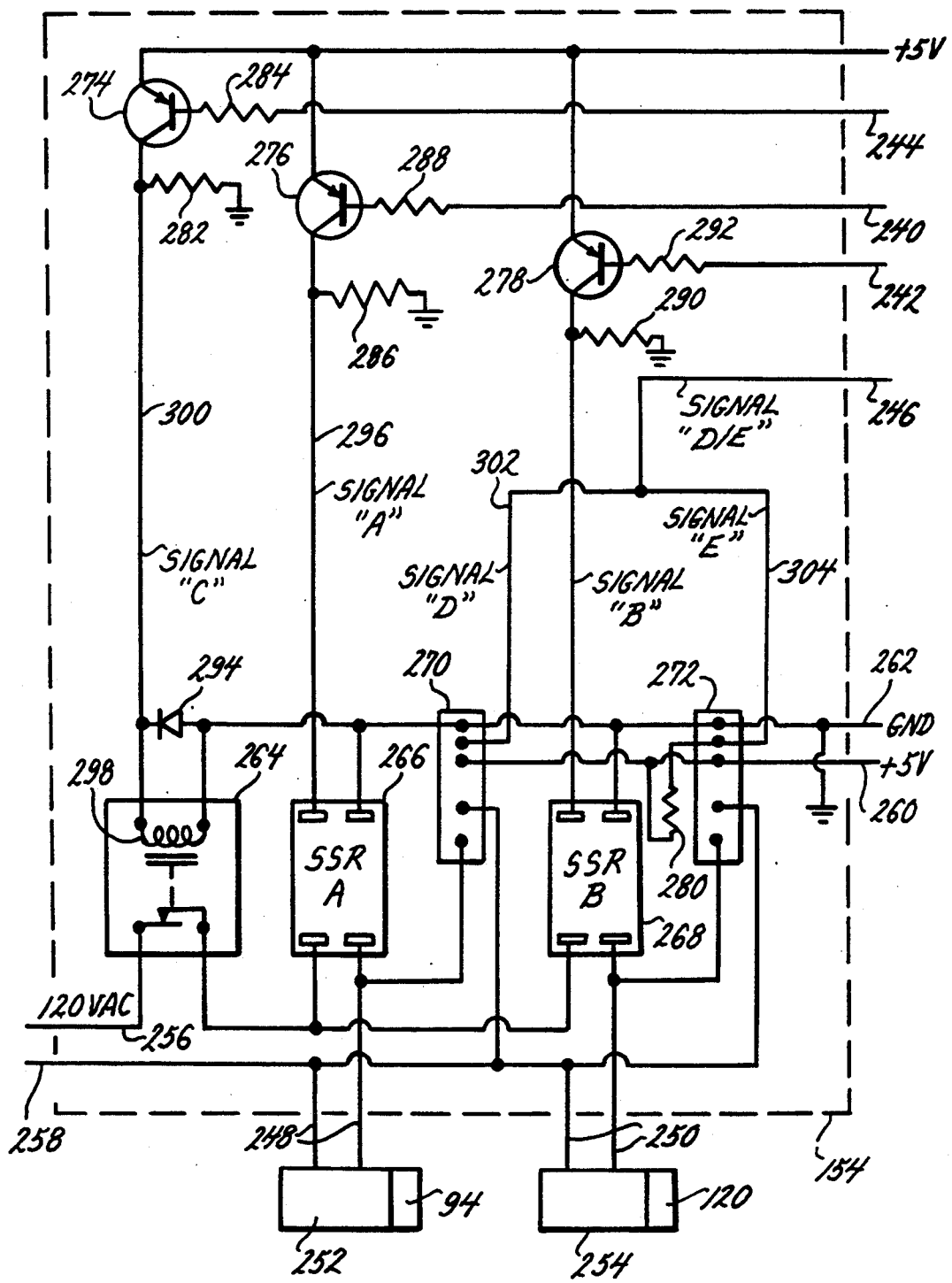
FIG. 7 is a schematic diagram of the output power control section of FIG. 6.

The output power control section 154 is shown in detail in FIG. 7. Inputs from the microprocessor 206 are provided on lines 240, 242, and 244. An output from the section 154 to the microprocessor 206 is provided on line 246. The output power control section 154 has 120VAC power outputs 248 and 250 to loads such as the acid pump motor 252 and the chlorine pump motor 254. Other loads may be used in this application, such as normally closed flow control valves for gravity feed liquid chemicals or solenoid driven piston pumps. Power inputs are 120VAC "hot" line 256 and "neutral" line 258, and 5VDC line 260 and ground line 262.

The output power control section 154 includes a normally-closed electromechanical relay 264, solid state relays (SSR) 266 and 268, AC input modules 270 and 272, transistors 274, 276, and 278, resistors 280, 282, 284, 286, 288, 290 and 292, and a relay coil surge-suppression diode 294. Heavy lines indicate 120VAC power and light lines indicate signal lines at 120VAC and 5VDC.

The electromechanical relay 264 and the solid-state relays 266 and 268 are used to control AC power to the motors 252 and 254. Grayhill #70S2-04-B-12-N is a commercial example of an SSR suitable for use in this application. The SSR 266, for example, conducts 120VAC current to the motor 252 when control signal "A" on line 296 is held between 3 to 30VDC, and does not conduct to thereby de-energize the motor 252 when the control signal "A" is at ground potential.

The relay 264 and SSRs 266 and 268 are controlled by individual output ports of the microprocessor 206 by means of drive transistors 274, 276, and 278, respectively. The transistors 274, 276, and 278 may be 2N3906 PNP devices which receive voltages from individual output ports lines 244, 240, and 242, respectively, of microprocessor 206 through their current-limiting resistors 284, 288, and 292, respectively. The bias resistors 282, 286, and 290 hold control signals C, A, and B, respectively, near ground potential when the associated transistor 274, 276 or 278 is not conducting. The surge-depression diode 294 prevents damage to the transistor 274 by shunting current that occurs due to collapse of the magnetic field in coil 298 when power is removed from the coil 298 of the relay 264.

It is known in the art that SSRs are highly reliable switches for AC power, but a common failure mode is to fail "output-shorted," that is, AC power continues to be supplied to the load after the control signal A or B, is removed. In this situation, the motor controlled by the output-shorted SSR continues to run after the controller 92 has sent a shut-off signal, and uncontrolled addition of chemicals to the pool 32 and/or spa 34 could continue until the supply of chemical is exhausted. This creates a potential health hazard which is eliminated by supplying the AC "hot" line 256 to the chemical pump SSRs 266 and 268 through the normally-closed electromechanical relay 264. Relay 264 is normally deactivated and acts as a simple pass-through of the AC "hot" line 256. When a failure condition is detected by the microprocessor 206, the relay 264 is activated by a 5VDC level (signal "C") on line 300 to remove the AC "hot" line 256 from the SSRs 266 and 268. Since relay 264 is an electromechanical relay which is normally closed and inactive, the reliability of the system 30 is enhanced because the relay 264 is not subject to the same failure-inducing mechanisms (such as power-line surges and spikes) which could damage a SSR.

The AC voltage across each motor 252 and 254 is sensed by the optoisolated AC input module, 270 and 272, respectively. There is no electrical connection between the 120VAC input lines 256 and 258 and the outputs of the modules 270 and 272. These modules are commercially available as Grayhill #70-IAC5. When 120VAC is at the input of such a module, a collector-emitter transistor junction therewithin conducts to produce an output.

In the system 30, 120VAC is sensed across the power connections 248 to motor 252 by module 270, and across power connections 250 to motor 254 by module 272. 5VDC and ground are supplied to the output circuit of each module 270 and 272, and 5VDC is connected to signal "D|E" on line 246 through current-limiting resistor 280. For module 270, signal "D" on line 302 is 5VDC when no AC is sensed across power connections 248 into motor 252 and signal "D" is pulled to ground by the conducting transistor in module 270 when 120VAC is detected. SSR 268, motor 254, and module 272 operate in a like manner with signal "E" on line 304 behaving like signal "D". The 120VAC signal sensed across power connections 248 on motor 252 should track control signal "A" as shown in the following table:

| Signal "A" | Voltage across Load | Signal "D" |
|---|---|---|
| (a) 5 V | 120 VAC | 0 V |
| (b) 0 V | (nil) | 5 V |
| (c) 0 V | (N/A) | 0 V |

If the conditions above are not met, for example if SSR 266 was output-shorted, then control signal "A"=0V and control signal "D"=0V.

Another possibility is the case where the motor 252 is open-circuited (by failure or disconnection). SSRs such as Grayhill #70S2-04-B-12-N have a maximum off-state leakage current of about 6 mA RMS. When a low-impedance load, such as a fractional horsepower motor used for a chemical pump, is connected, the voltage developed by the leakage current through SSR 266 is below the detection threshold of the module 270, but when the motor 252 presents a high-impedance or open-circuit, 120VAC (limited to 6 mA) is produced across the input to module 270. This is enough current for module 270 to sense the AC voltage and produce the result in the following table:

| Signal "A" | Voltage across Load | Signal "D" |
|---|---|---|
| (c) 0 V | (N/A) | 0 V |

The combination of cases (a), (b), and (c) allow the microprocessor 206 to detect run-on of a pump due to SSR output-shorted and an open-circuit load due to electrical failure in the pump motor or disconnection of the pump motor. These are both useful for product safety and to insure proper electrical connection of the chemical pumps.

A truth table for allowable states of signals "A", "B", and "D|E" appears below. Signal "D|E" is the logical "OR" of signals "D" and "E". The "pull-to-ground" feature of the AC input module's output stage permits a single signal to monitor two (or more) loads, provided they are not operated simultaneously.

|  | Signal "A" | Signal "B" | Signal "D/E" |
|---|---|---|---|
| (1) | 1 | 1 | (not used) |
| (2) | 0 | 1 | 0 |
| (3) | 1 | 0 | 0 |
| (4) | 0 | 0 | 1 |

Note also that the first case is not used in a system with arrangement as shown in FIGS. 1 and 2 with single manifold 74 because the acid pump 94 and the chlorine pump 120 are never active simultaneously. The truth table is valid for situations with no output-shorted relays (cases 1, 2 or 3) or open-circuit loads (4th case). The truth table is evaluated whenever a chemical pump motor is either turned on or off.

Any combination of signals "A", "B", and "D|E" not in the table above will trigger the microprocessor 206 to activate signal "C" on line 300 by pulling its output pin connected to line 244 to a logical low state. This causes transistor 274 to conduct, activating relay 264, and removing 120VAC from both SSRs 266 and 268 to electrically isolate both motors 252 and 254. In the case of an open-circuit load, relay 264 also opens. With activation of relay 264, lights on the front panel 230 flash, alerting service personnel of an error in condition. The controller 92 is disabled from output control by electrical isolation of the pump motors 252 and 254 and enters a failure mode execution trap (endless loop). In this loop, the modem 110 receives a command from microprocessor 206 to dial a telephone number stored in nonvolatile RAM 214. After connection is established to the remote terminal 108 through modem 112, a message indicating the type of failure in the output power control section 154 is transmitted.

In another embodiment, the chemical feed systems could be operated by 5 or 12 volt DC motors. In this case, the circuit in FIG. 7 may be modified by replacing the AC solid state relays 266 and 268 and the AC input modules 270 and 272 with DC solid state relays and DC input modules. The 120VAC "hot" line 256 is replaced by the positive DC voltage and the "neutral" line 258 by ground. The principle of output power monitoring disclosed above applies directly to this alternative embodiment.

Figure 8:
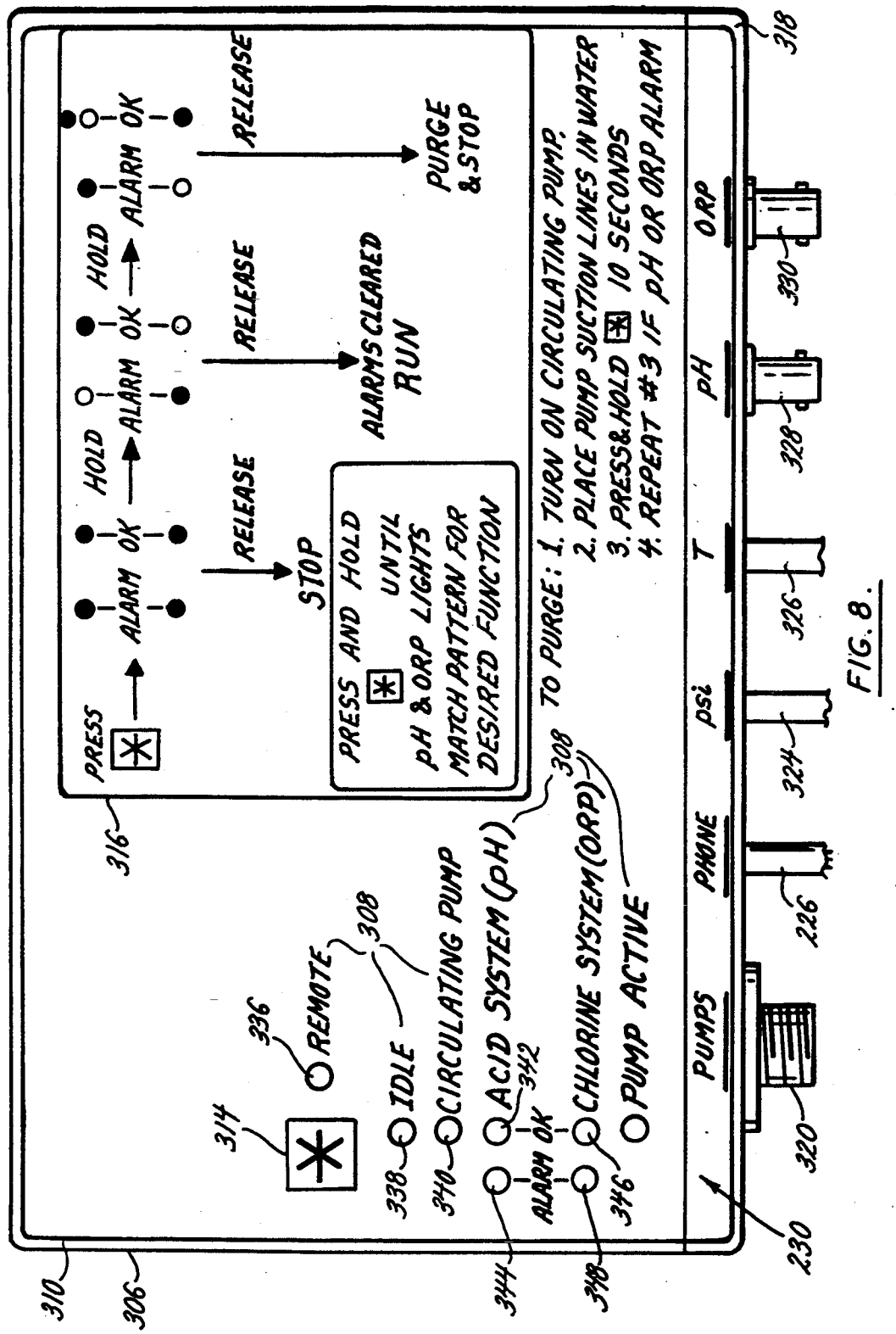
FIG. 8 is a front view of the electronics enclosure and front panel of the present invention.

FIG. 8 shows a frontal view of an enclosure 306 for the controller 92 showing the front panel 230. Aspects and features of the front panel 230 can be defined by a suitable indicia 308 on a multicolored, plastic, adhesive-backed decal 310. The decal 310 has clear regions through which light-emitting diodes (LEDs) adjacent to the indicia 308 are visible. The decal 310 is flexible and allows actuation of a pushbutton switch 314 which controls the status of the system 30. This arrangement provides a weather-proof seal for the LEDs and the pushbutton switch 314. Inset 316 in the front panel decal 310 informs the user of means to select various operating modes by pressing and holding the pushbutton switch 314. A second inset 318 identifies electrical connections to controller 92. These connections are made by a multiconductor circular plastic connector 320, which carries power to the acid pump motor 252 and the chlorine pump motor 254, the telephone cable 226 terminating in the RJ-11 jack 228 for connection to telephone service, a cable 324 to the recirculating pump pressure switch 80, optionally a cable 326 for connection to the temperature sensor 82, and male BNC connectors 328 and 330 for connection to female BNC connectors (not shown) on pH and ORP sensor cables 156 and 180, respectively.

A green LED 336, labeled "Remote", illuminates when the modem 110 detects a carrier on the telephone line 226 and controller 92 is communicating with the remote terminal 108. The green "Remote" LED 336 is blinked slowly off and on while microprocessor 206 sends initialization sequences to modem 110 on modem bus 224. LED 336 may be flashed on briefly every 1 to 2 seconds to indicate that the modem 110 is operating properly. Absence of this flash could be used to signal the user that a modem failure has occurred.

Red LED 338, labeled "Idle", and green LED 340, labeled "Circulating Pump", indicate the status of the recirculating pump 50 determined by the pressure switch 80. When no discharge pressure is detected, LED 338 is illuminated and when discharge pressure is detected, LED 340 is illuminated. An indication that electrical power is supplied to controller 92 is provided by LEDs 338 and 340, since either LED 338 or LED 340 is illuminated whenever controller 92 is powered.

LEDs also are used to signal the status of the acid and chlorine systems as well as to indicate other aspects of system operation. When the acid system is operating normally and the water pH is within upper and lower control limits, a green LED 342 is illuminated. A failure of the acid pump 94 or the pH sensor 76, a failure of the acid pump 94 to prime or purge, or pH out of range causes a red LED 344 to illuminate. When the chlorine system is operating normally and the water ORP is within upper and lower control limits, a green LED 346 is illuminated. A failure of the chlorine pump 120 or the ORP sensor 78, a failure of chlorine pump 120 to prime or purge, or ORP out of range causes red LED 348 to illuminate.

Figure 9:
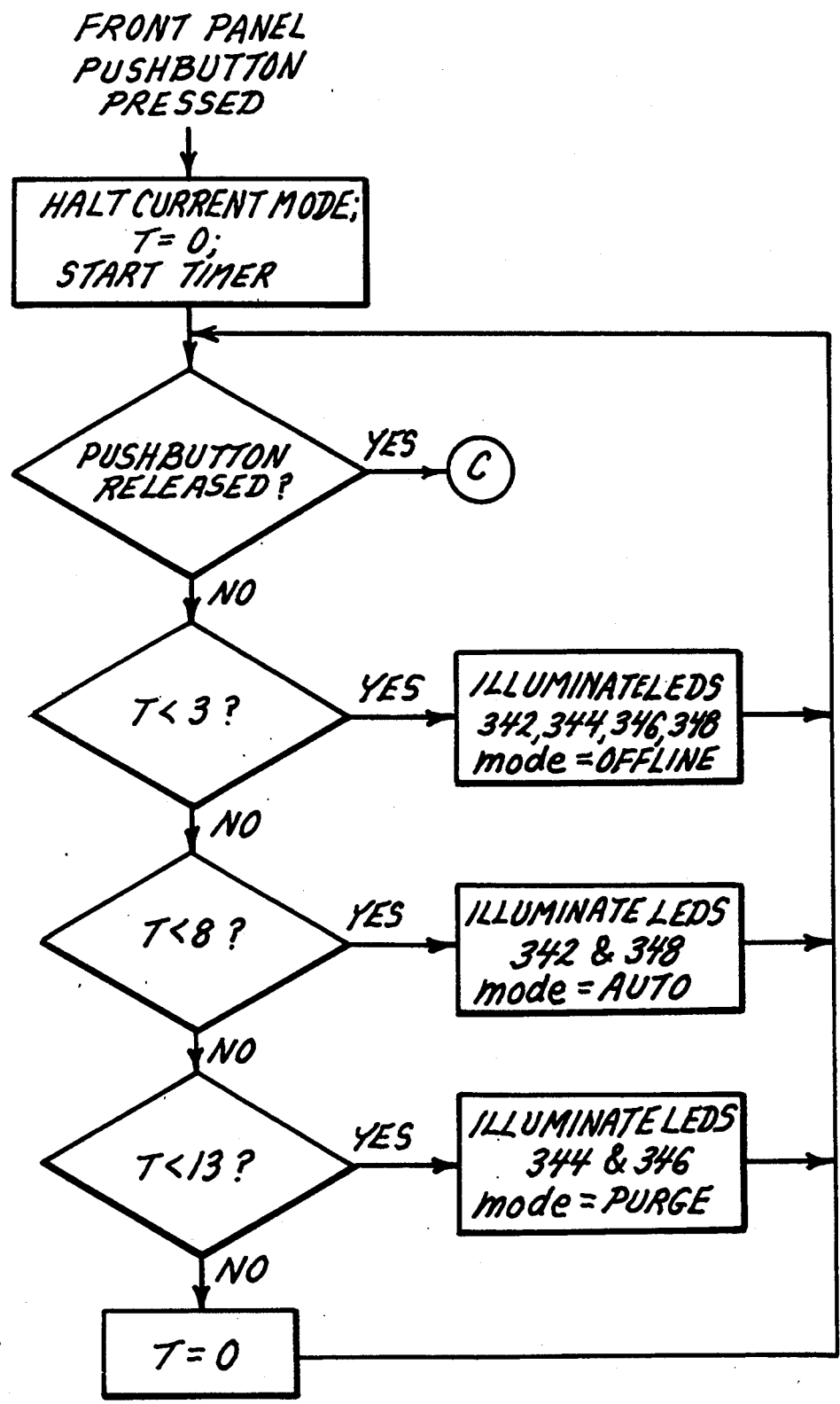
FIG. 9 is a flowchart of the interrupt handling routine for the front panel pushbutton switch.

A further use of LEDs 342, 344, 346 and 348 is to operate conjunction with pushbutton switch 314 as described in decal inset 316 where the operator is advised to press push button switch 314 and hold it until a combination of the LEDs 342, 344, 346, and 348 illuminate to indicate that the system 30 is in its "STOP" mode, its "Alarms Cleared RUN" mode or its "PURGE and Stop" mode. FIG. 9 provides a flowchart of such process. In any operational mode, pressing pushbutton switch 314 first illuminates LEDs 342, 344, 346 and 348. Releasing pushbutton switch 314 anytime within three seconds leaves LEDs 342, 344, 346 and 348 illuminated, indicating controller 92 has entered the offline ("stop") mode. If the pushbutton switch 314 is held down for more than three seconds but less than eight seconds, the pattern changes to only LEDs 342 and 348, causing controller 92 to clear alarm conditions, reset, and begin automatic operation. If the pushbutton switch 314 is held down for more than eight seconds, but less than thirteen seconds, the pattern changes to only LEDs 344 and 346, causing controller 92 to perform a purge cycle. Holding pushbutton switch 314 down for more than thirteen seconds causes the cycle described above to repeat.

The PURGE cycle is used to flush chemicals from pumps 94 and 120, suction lines 99 and 126, and discharge lines 101 and 128. This feature allows these components to be serviced safely by service personnel with minimum exposure to muriatic acid 96 (the usual acid of choice) and liquid chlorine 122 (as sodium hypochlorite). For a purge, the user disconnects suction lines 99 and 126 from containers 98 and 124. Suction lines 99 and 126 are then placed into a bucket of water and the PURGE cycle is started.

When pumping chemical into manifold 74 with recirculating pump 50 operating, injecting liquid chlorine (sodium hypochlorite) 122 causes the measured pH to rise to a high value, typically a pH of 9.0 or more. When acid 96 is injected, the measured pH will drop to a low value, typically pH of 5.0 or less. When the acid suction line 99 is placed in a bucket of water, operating the acid pump 94 will cause the water to flow through the acid feed system comprised of suction line 99, pump 94, discharge line 101, and injector 100 purging the acid contained therein into manifold 74. Similarly, when chlorine suction line 126 is placed in a bucket of water, operating the chlorine pump 120 will cause the water to flow through the chlorine feed system composed of suction line 126, pump 120, discharge line 128, and injector 102 purging the liquid chlorine contained therein into manifold 74. When all chemical is flushed out of a pump, suction line, and supply line, the pH measured in manifold 74 with the chemical pump operating will approach the pH of the incoming pool water flow 72. This indicates that the chemical contained in the lines and pump has been replaced with water.

Effective purging can be obtained by operating the desired chemical pump 94 or 120 for the time required to move an air bubble from the supply to the injector in manifold 74 plus an additional period to account for the effects of the mixing of water and chemical in the pump and lines. This time is typically 1 to 5 minutes depending on pump capacity, tubing length, and tubing diameter. Individual times for the acid and chlorine systems are stored in nonvolatile RAM 214 and may be changed by teleservicing the controller 92 from the remote terminal 108.

With the recirculating pump 50 running and the PURGE mode activated, microprocessor 206 first measures and records a reference pH in manifold 74. It then turns on the acid pump 94. After 30 seconds, the pH is monitored. The pump 94 continues to run for its specified period or until the pH returns to within 0.1 of the reference value. If the pH is within 0.1 of the reference value within the specified time, the "OK" LED 342 for the acid chemical system is illuminated signifying a successful purge where the acid chemical pump 94 and its lines contain only very dilute concentrations of acid. If the time is exceeded without the pH returning to within 0.1 of the reference value, the "Alarm" LED 344 for the acid chemical system is illuminated and the process stops. It may be restarted through the front panel pushbutton switch 314 or remotely through the modem 110.

If the purge is successful, the process is repeated for the chlorine system. If a failure to purge the chlorine pump 120 and its lines occurs, the process may be repeated. In this case, the acid system is purged again for the minimum 30 seconds before the chlorine system is purged. If at any time in the PURGE cycle, the recirculating pump 50 stops pumping as indicated by the pressure sensor 80, the PURGE process is aborted. Whether the PURGE process purges the acid or chlorine systems first is not critical to a proper purge. Also note that the chemical containers 98 and 124 preferably are located physically below the lines 99, 101, 126 and 128, the manifold 74 and the pumps 94 and 120 to eliminate any chance that a substantial amount of the chemical can spill or siphon due to a leak or failure of the system 30.

Figure 10:
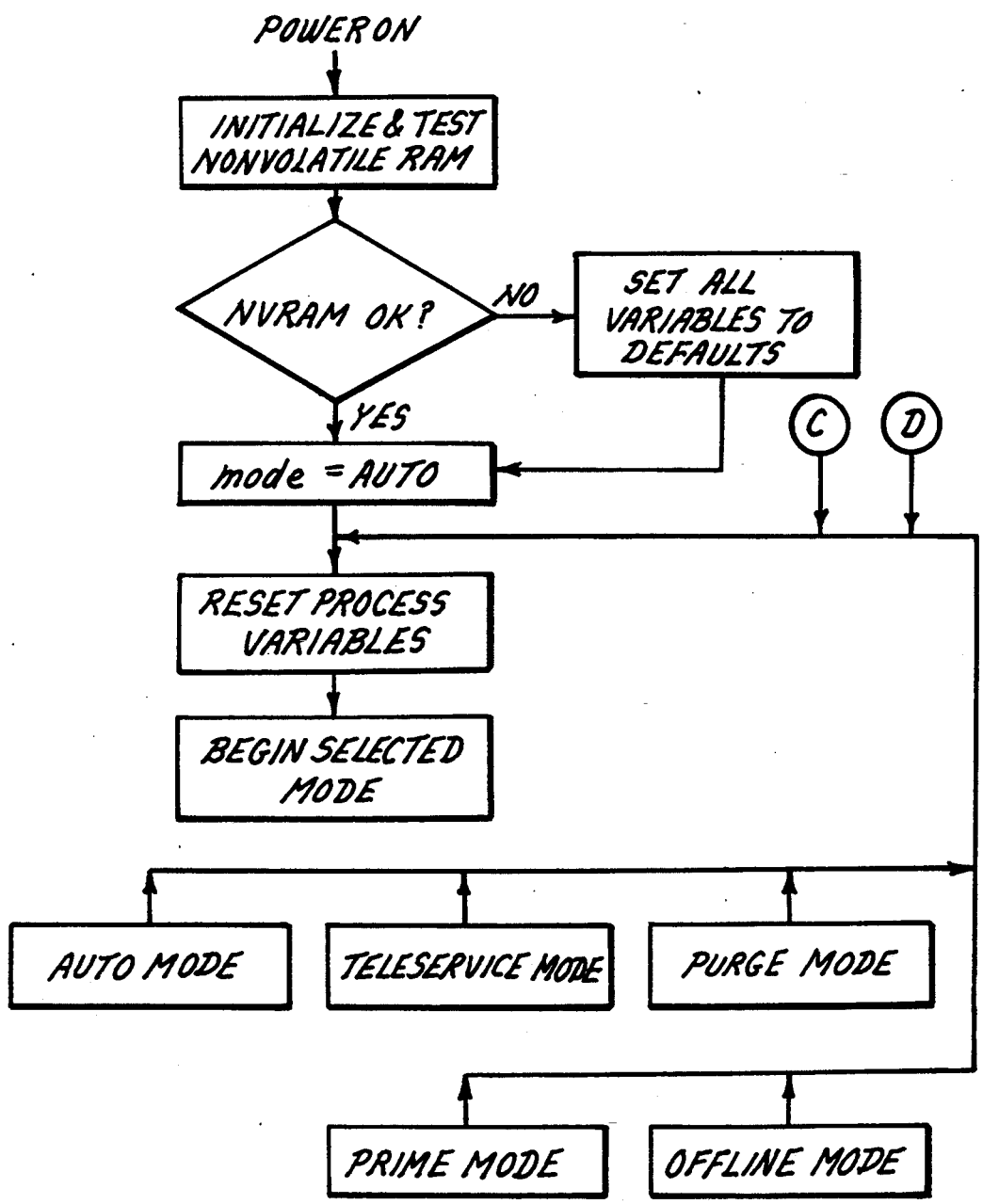
FIG. 10 is a flowchart of the main procedure of the control program.
Figure 11B:
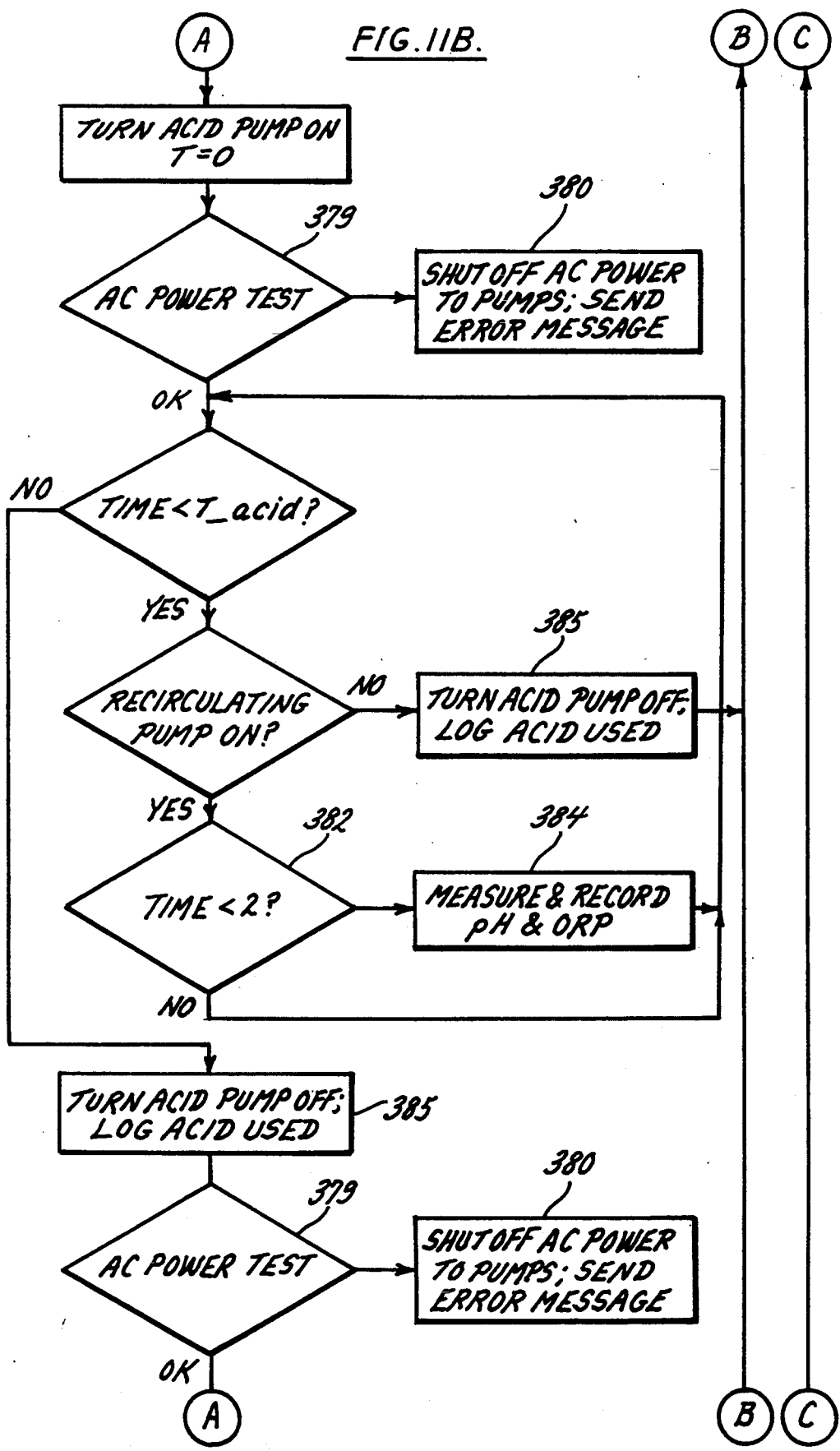
Figure 11D:
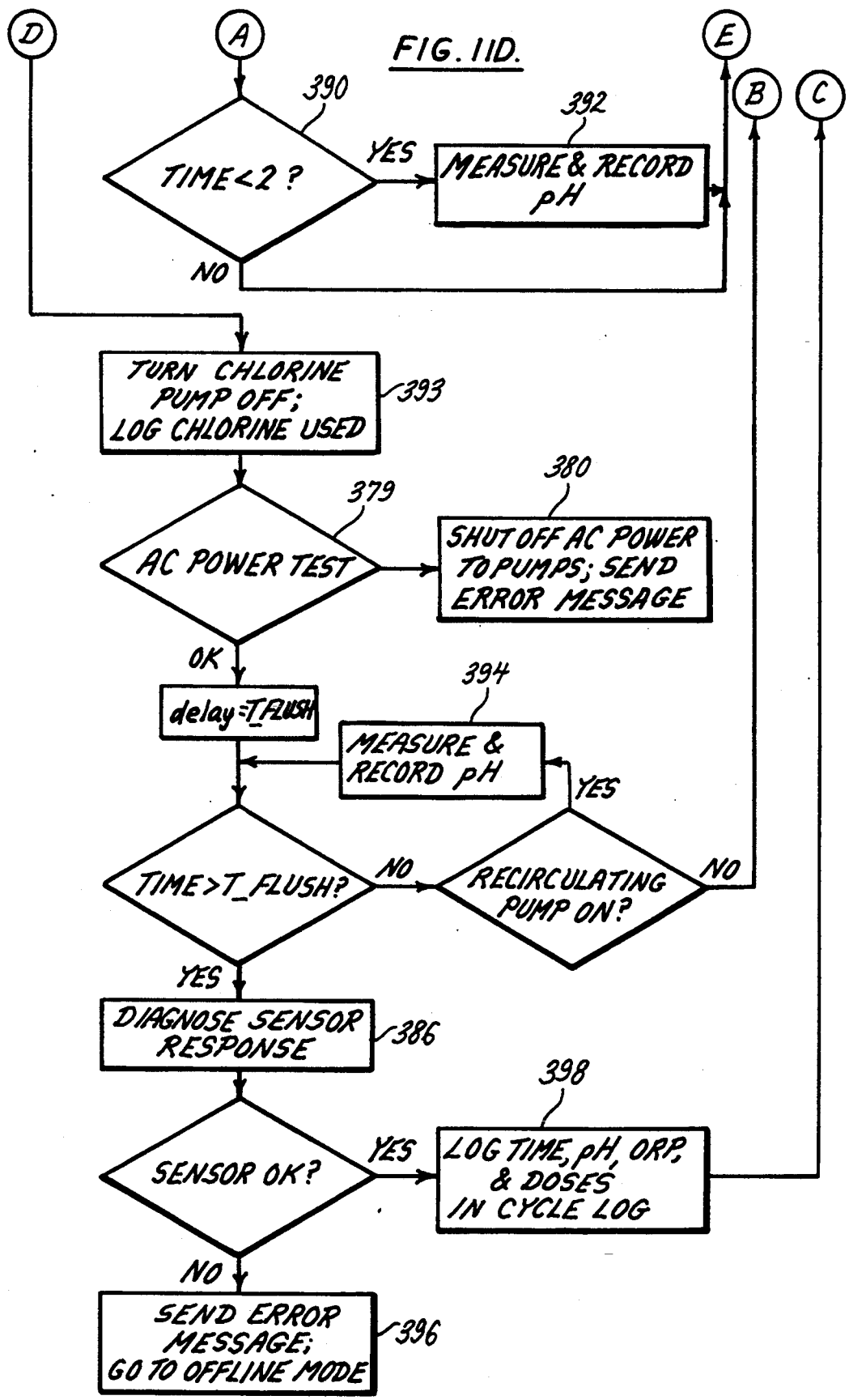

FIG. 10 shows the startup and restart sequence for controller 92. When power is applied to controller 92, it performs a checksum of the configuration data stored in nonvolatile RAM 214. If the checksum agrees with a value stored in RAM 214, the automatic mode is selected and process variables are reset to nominal values. If a checksum error occurs, signifying corruption of data in RAM 214, configuration values are set to defaults. A warning message will be displayed on the process report indicating corruption of the configuration data. Alternatively, a service center telephone number stored in ROM 216 can be used by the modem 110 to dial out and send an error message to the remote terminal 108.

The controller 92 has five main operational modes: automatic mode, teleservice mode, purge mode, prime mode, and offline mode. Upon termination of these modes, control returns to the restart routine to reset process variables and enter the next mode selected by the termination conditions in the originating mode.

The automatic mode is the normal mode of operation of the controller 92. It is entered upon application of power to the controller 92, and remains active until a failure is detected or it is interrupted by pressing the front panel pushbutton switch 314 or by a serial request from the remote terminal 108 via the modems 110 and 112. The automatic mode terminates into the teleservice mode, purge mode, or offline mode.

The offline mode idles the controller 92 and produces no control action nor does it log process variables such as pH and ORP. The offline mode can be terminated by the front panel pushbutton switch 314 or by a serial request from the remote terminal 108 via the modems 112 and 110. The offline mode terminates into either automatic mode, prime mode, purge mode, or teleservice mode.

The purge mode terminates automatically into the offline mode.

The teleservice mode allows the remote terminal 108 to access a control panel allowing configuration data for the control cycle to be reviewed and modified, and diagnostic tests to be performed. It will be described in more detail subsequently. The teleservice mode terminates in either the automatic mode, offline mode, or prime mode by request from the remote terminal 108. In case of no user input after a specified number of seconds, or failure of the remote communications link, the teleservice mode terminates and the automatic mode is restarted.

The prime mode is entered from the teleservice mode, primes the chemical pumps 94 and 120, and enters the automatic mode. If either of the chemical pumps 94 and 120 fails to prime, the controller 92 may enter the offline mode or reenter the prime mode at the option of the user.

Figure 12:
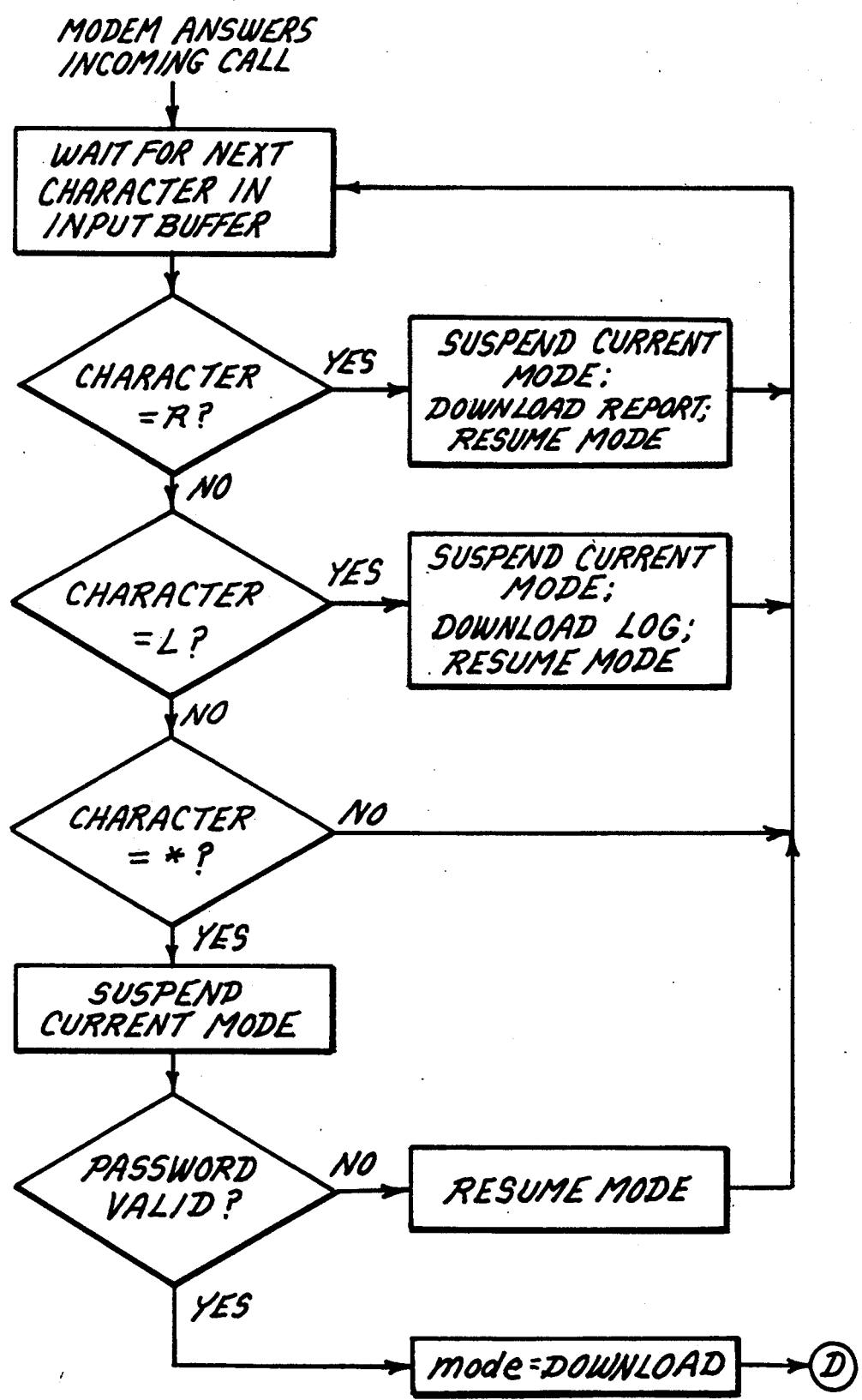
FIG. 12 is a flowchart of the serial request handling routine.

FIGS. 11A, 11B, 11C, and 11D are a flowchart describing the automatic mode. Overall, the automatic mode process is a repeating cycle consisting of a "mixing time" delay followed by pH and ORP measurement, calculation of acid dose and acid injection, a flush delay, calculation of liquid halogen dose and liquid halogen injection, logging of process data, and a mixing time delay beginning another cycle. In FIGS. 11A–D, acid is shown to be injected first followed by liquid halogen. Another embodiment of the automatic mode injects liquid halogen followed by acid. In other respects, the process is substantially similar to that shown in FIGS. 11A–D. Four processes take place in the automatic mode: measurement, calculation, control of injection of chemical doses, and logging of cycle process variables; display of current process variables every five seconds when the serial link through modems 110 and 112 is active; monitoring the front panel pushbutton switch 314; and monitoring the serial link for a serial access request from the remote terminal 108. FIG. 12 is a flowchart for the serial monitor routine. The notations "C" and "D" in FIGS. 9 and 12 refer to return points in the flowchart of FIG. 10.

Upon entering automatic mode, cycle variables are initialized by process 360. The controller 92 has three modes within the automatic mode: pool mode; spa mode; or autodetect mode. In the first two cases, the controller 92 initializes cycle variables with one of two sets of configuration variables stored in the nonvolatile RAM 214. In this case, "pool" and "spa" may simply be two different reservoirs, each with a set of control parameters representing differences in water volume, circulation characteristics, or desired aggressiveness of bactericidal action. These two systems share the recirculating system 35 shown in FIG. 1. This is the common situation for an integral pool/spa in residential use. In another case, "pool" and "spa" may be two different sets of parameters for the same reservoir to account for heavy summer use and closure during the winter. In the autodetect mode, the controller 92 determines whether a pool or spa is the control target and then selects the appropriate set of configuration variables. In autodetect mode, the automatic mode cycle begins with spa parameters as the default for reasons which will be clear in the discussion of the autodetect mode to follow.

The measurement of recirculating pump pressure by pressure switch 80 is processed. If pump pressure exists, the system 30 activates. Otherwise it remains in standby through process 362. In process 362, when the modem 110 detects a carrier on the phone line, an automatic mode idle message is transmitted with the time and date the recirculating pump 50 shut off. This provides useful information to service personnel indicating the recirculating system 35 or controller 92 may not have operated for a extended period of time.

At multiple points in the automatic mode cycle, recirculating pump pressure is checked and loss of pressure causes the program to return to initialization process 360 and the standby loop through process 362.

When the recirculating pump 50 is active, the display process 364 activates every 5 seconds producing the real-time process control log as shown below.

| CYCLE TIME, | sec, | pH, | ERR, | GAIN, | ORP, | ERR, | GAIN | |
|---|---|---|---|---|---|---|---|---|
| 0:24:10, | 1450, | 7.52, | 0.02, | 1.0, | 645, | −30, | 6.0, | P |
| 0:24:15, | 1455, | 7.52, | 0.02, | 1.0, | 645, | −30, | 6.0, | P |
| 0:24:20, | 1460, | 7.52, | 0.02, | 1.0, | 645, | −30, | 6.0, | P |
| 0:24:25, | 1465, | 7.52, | 0.02, | 1.0, | 645, | −30, | 6.0, | P |

This is transmitted over the modems 110 and 112 to the remote terminal 108 whenever a carrier is detected. The log contains the cycle time in HH:MM:SS format, the cycle time in seconds, the current pH reading and error from set-point, the pH gain, the current ORP reading and error from set-point in millivolts, the ORP gain, and an indication of mode ("P" for pool, "S" for spa). Additionally, an "A" or a "C" appears to the left of "P" or "S" when the acid pump 94 or chlorine pump 120 respectively is active. Commas are used as field separators to facilitate loading this data into a personal computer spreadsheet program, such as LOTUS 1-2-3 or MicroSoft Excel, for analysis and real-time data control charting.

Test process 366 determines if the recirculating pump 50 has just started. This is done by comparing the signals 88 from the pressure switch 80 several seconds apart. If pump start is detected, process 368 automatically primes the chemical pumps 94 and 120 and tests the pH and ORP sensors 76 and 78. Optionally, the user can remotely configure the controller 92 to go into the offline mode if a failure to prime or sensor failure occurs at this point.

Process 368 operates on the principle that chemicals pumped into manifold 74 with the recirculating pump 50 running will cause large and rapid changes in the pH and ORP measurements. This is inherent in the design of manifold 74, which places the pH sensor 76 downstream of the acid and liquid chlorine injectors 100 and 102, and the ORP sensor downstream of the acid injector 100. These sensors 76 and 78 are exposed to chemicals diluted only by the flow through manifold 74. This flow 72 is a small fraction of the total recirculating flow 56, which may be over 200 gallons per minute in a typical 80,000 gallon pool. When liquid chlorine 122 is injected, the pH rises to a high value (typically pH 9.0 or more). When acid 96 is injected, the pH drops to a low value (typically pH 5.0 or less).

To prime the chemical feed units, an initial measurement of pH and ORP are taken of the water flow 72 circulating through manifold 74. The chlorine pump 120 is activated and allowed to run until a high pH is sensed or a time limit is exceeded. Tests show that a completely primed system will produce a pH response in less than 2 seconds after the chlorine pump 120 (or acid pump 94) starts. The time limit on priming the chlorine pump 120 is chosen based on the length and size of supply lines 126 and 128 and capacity of chlorine pump 120. This time should be at least that required to move a bubble from the supply 124 to the injector 102, typically 1 to 5 minutes. After the chlorine prime is verified, a delay of 30 seconds allows the liquid chlorine 122 to be flushed out of the manifold 74 before the acid prime begins. This prevents generation of chlorine gas which occurs when liquid chlorine 122 and muriatic acid 96 are mixed together. Chlorine gas is hazardous, so care is taken to make sure that the acid and chlorine pumps 94 and 120 are never operated simultaneously. The acid feed system is then activated and allowed to run until a low pH is sensed or the pump time limit is exceeded. The pump time is chosen similarly to that for the chlorine system. The ORP is also measured and expected to increase above 900 mV during the addition of acid 96.

During the prime process, the sensor readings and speed of response are compared to standard responses to determine if the sensors 76 and 78 are operating normally. Loss of recirculating pump pressure (or flow) during the prime process causes the controller 92 to abort, preventing further chemical injection into manifold 74.

After priming, the automatic cycle continues with a delay, shown as processes 370 and 371 in FIGS. 11A–D. The dosage of chemicals occurs at discrete times, rather than by continuous addition. This allows for the pool or spa to respond to the addition of chemicals given the time delay between injection into the pool (or spa), mixing, transport, and measurement by the sensors 76 and 78. This circulation delay, or "mixing time", depends upon the circulation characteristics of the pool 32, the number and location of the injection and suction ports 144 and 36, and the capacity of the recirculating pump 50. For a swimming pool, this mixing time is typically 60 to 120 minutes. The controller 92 operates on a control cycle period, T_cycle in processes 370 and 371, which is a fraction of the mixing time, typically 15 minutes for a pool. A spa 34 has more aggressive circulation, and the cycle period is typically equal to the spa's mixing time, 2 to 10 minutes.

Starting the automatic mode cycle with a delay allows still water in the reservoir (pool 32 or spa 34) to mix and purges stale water accumulated in the strainer 48 and filter 58 before taking pH and ORP readings. At the end of the delay, process 372 is provided to make pH and ORP measurements for calculating chemical doses. If the autodetect option is selected, it evaluates the history of pH and ORP responses to chemical addition to determine if the pool or spa mode should be selected.

Modern residential swimming pools often have an integral spa which shares the water circulation and filtration equipment with the pool. This arrangement is presented in FIG. 1. A typical residential pool has a volume of 15,000 to 40,000 gallons and; its integral spa has a typical volume of 800 to 1200 gallons. The difference in water volume and circulation characteristics between a pool 32 and spa 34 give different magnitudes and speeds of response to a chemical dose. A dose of chemicals will produce a larger, faster pH and ORP response in a spa 34 compared to the same dose in a pool 32.

When autodetect is selected, the automatic mode cycle starts in spa mode. This is because a pool dose into a spa 34 will result in chemical overdose for the same pH and ORP errors. During the first automatic mode cycle after the recirculating pump 50 starts, if an ORP error exists, a first chlorine dose for the spa water volume is injected. On the second spa control cycle, if the ORP error is less than a first prescribed value, the control object is assumed to be the spa 34. A second spa mode control cycle is completed with a chlorine dose based on the current ORP error. After a third spa mode control cycle and on each subsequent cycle, with the chlorine dose based on the spa volume and the ORP error measured on that cycle, switch over to a pool occurs if the ORP control is unable to keep up with chlorine demand. This is accomplished as follows where the last three or more cycles have been in spa mode:

If the average ORP error on the last three cycles is greater than a second prescribed value, then the control object is a pool;
- or -
If the ORP error on the last two control cycles is greater than a third prescribed value, then the control object is a pool;
- or -
If the average ORP error on the last three cycles is greater than a fourth prescribed value, and the average change of the ORP error is less than a fifth prescribed value, then the control object is a pool.

Once pool mode is selected, an overshoot in ORP beyond a sixth prescribed value due to pool mode parameters used on a spa's smaller volume immediately identifies the control object as a spa.

Measurement of water temperature provides a further means to distinguish pool from spa. If the water temperature is above a seventh prescribed value, spa mode is selected.

Returning to FIGS. 11A–D, the acid dose is computed by process 374. Later in the control cycle, process 376 is provided to compute the chlorine dose. Optionally, both acid and halogen doses can be computed at process 374 by combining the calculations. The result of both processes are the times, T_acid and T_chlr, respectively, for the chemical pumps 94 and 120 to operate. These times are based on the needed chemical dose and the pump feed rate.

The quantity of chemicals added depends directly on several factors including the pH and ORP set-points, the measured values of pH and ORP and their time-history, the volume of water, and a set of process gains. Furthermore, the addition of chemicals to a diluent, such as water, generally produces a nonlinear response between quantity added and a response variable. This is called a titration curve for the particular combination of chemical and diluent. The titration curve also depends on factors which affect the equilibrium of dissolved species. As discussed earlier, the concentration of hypochlorous acid is a strong function of pH.

The present invention uses the digital microprocessor 206 to calculate a dose based on the essential nonlinearity of chemical demand determined by titration curves for acid and halogen, preferably liquid chlorine. This provides a substantial improvement over heretofore available systems in terms of the accuracy of the dose, and the speed and quality of the response produced thereby. Furthermore, overdose and underdose are minimized and economy of chemical usage is assured.

Figure 13:
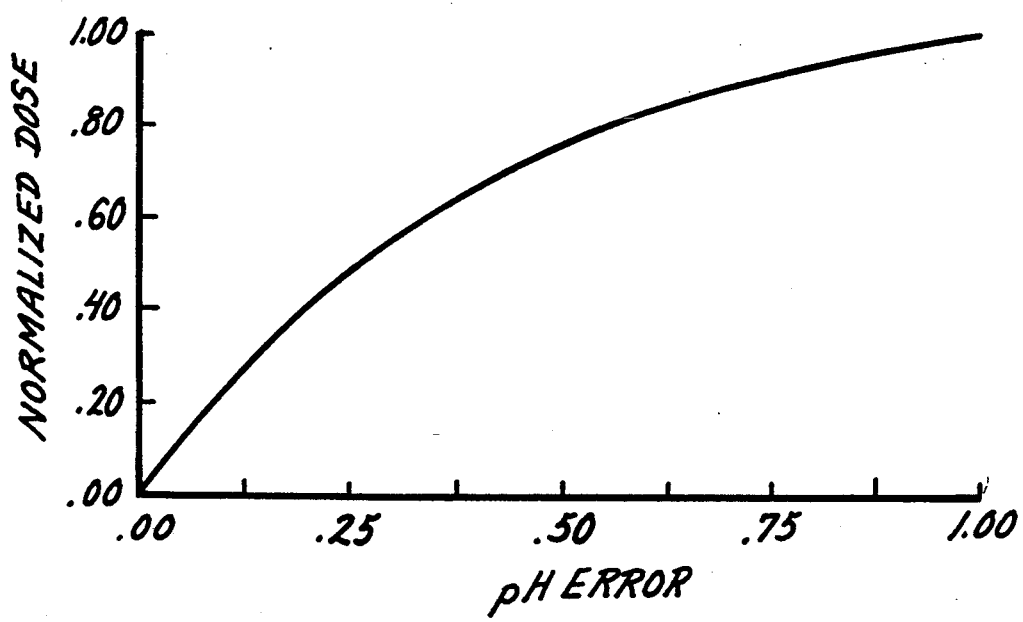
FIG. 13 is a titration curve for muriatic acid.

FIG. 13 shows a normalized titration curve for muriatic acid. The pH error is the set-point for pH (nominal pH) subtracted from the measured value to produce a positive value when muriatic acid must be added. The normalized dose is that required to bring water back to the nominal pH when the measured value was 1 pH unit too high. A dynamic range for pH control of 0.5 to 1.0 or more pH units is typically required to bring water in an out-of-balance condition into the control range of 7.4 to 7.6 for a pool or spa. This curve is highly nonlinear, and linearizing it at any point will produce significant overdoses and underdoses of acid. The present system implements the acid titration curve with corrections for water temperature and produces an accurate dose of muriatic acid for any positive pH error within the range of the pH measurement system. The dose calculation additionally involves process gains, pool volume, and acid concentration.

Figure 14:
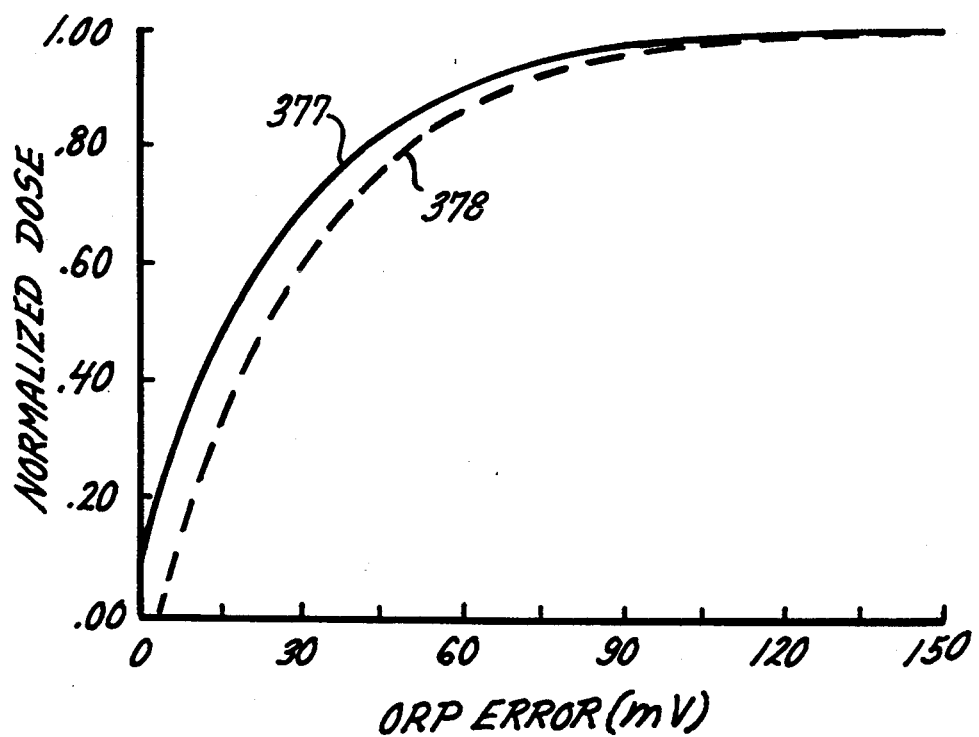
FIG. 14 is a titration curve for liquid chlorine.

FIG. 14 is a normalized titration curve for liquid chlorine (sodium hypochlorite) showing the effect of pH on chlorine dose. A higher pH value produces curve 377, while a lower pH value produces curve 378. The ORP error is the measured value subtracted from the set-point for ORP (nominal value) to produce a positive value when liquid chlorine must be added. The normalized dose is that required to bring water back to the nominal ORP when the measured value was 150 mV below the set-point. FIG. 14 shows the interdependence of chlorine dose on pH, following the increasing concentration of hypochlorous acid at lower pH. FIG. 14 also shows that a chlorine demand computed by linearizing either titration curve at low errors (less than 20 mV) will significantly overdose a pool with liquid chlorine for a large ORP error. The present system implements the chlorine titration curve with corrections for pH and produces an accurate dose of liquid chlorine for any positive ORP error within the range of the ORP measurement system. The dose calculation additionally involves process gains, pool volume, and liquid chlorine concentration.

Returning once more to FIGS. 11A–D, process 374 produces acid pump time T_acid. The acid pump 94 is turned on and process 379 is provided to evaluate the truth table accompanying the discussion of FIGS. 11A–D to validate operation of the output power control section 154. A failure causes the control program to begin process 380, which is the execution trap which isolates both chemical pumps from electrical power and sends a message to the remote terminal 108 as previously discussed.

Processes 382 and 384 provide a record of pH and ORP responses shortly after the acid pump 94 starts. This information is used to validate sensor responses later in process 386 at the end of the control cycle.

The acid pump 94 is shut off if either pump run time, T, is greater than T_acid or a loss of recirculating pump pressure is detected. Process 385 shuts off the pump 94 and logs the amount of acid 96 used. This is subtracted from a quantity stored in nonvolatile RAM 214 indicating the quantity remaining in the acid container 98. The initial quantity of acid in the container 98 is set and updated by service personnel. In this manner, an approximate accounting of acid 96 remaining is kept and presented to the remote terminal 108 by modem 110 when a process report of the user control panel is requested. This feature is provided to advise service personnel when to refill acid and chlorine containers and further minimizes the need for on-site inspection and maintenance of the present automatic monitor and control system 30.

When the acid pump 94 is turned off, process 379 evaluates the performance of the output power control section 154. This is also done in case the recirculating pump pressure caused an acid pump shut-off, but is not shown for clarity.

The manifold 74 is now flushed for a period T_flush, typically 45 seconds, to assure that muriatic acid has been flushed out of manifold 74 before chlorine addition. During this period, process 388 is provided to measure and record the effects of the diminishing acid concentration on pH and ORP sensors 76 and 78 for analysis in process 386.

The chlorine dose is computed in process 376 and produces chlorine pump time T_chlr. The pump 120 is turned on and its electrical response is monitored by process 379. Processes 390 and 392 are provided to record the first few seconds of pH sensor response to chlorine addition. The ORP reading is unaffected during this time because the ORP sensor is upstream of the liquid chlorine injector 102.

The chlorine pump 120 is shut off if either pump run time, T, is greater than T_chlr or a loss of recirculating pump pressure is detected. Process 393 shuts off the pump 120 and logs the amount of chlorine 122 used. This is subtracted from a quantity stored in nonvolatile RAM 214 indicating the quantity remaining in the chlorine container 124. Like acid, initial chlorine quantity is set and updated by service personnel. In this manner, an approximate accounting of the chlorine 122 remaining in the container 124 is kept and presented to the remote terminal 108 by the modem 110 when a process report of the user control panel is requested.

When the chlorine pump 120 is turned off, process 379 evaluates the performance of the output power control section 154. This is also done in case the recirculating pump pressure caused a chlorine pump shut-off, but is not shown for clarity.

The manifold 74 is now flushed for a period T_flush, typically 45 seconds, to allow process 394 to measure and record the effects of the diminishing chlorine concentration on the pH sensor 76 for analysis in process 386.

Process 386 is provided to verify the operation of chemical pumps 94 and 120 and sensors 76 and 78 on each control cycle. It operates using principles embodied in the purge and prime functions, that is a large and rapid pH response is expected with the injection of liquid chlorine 122 and large and rapid pH and ORP responses are expected with the injection of acid 96 into manifold 74. Process 386 uses pH and ORP readings at the beginning of the cycle as reference values, when manifold 74 has been purged of chemicals for the duration of one T_cycle. If pH and ORP are within nominal ranges, that is above the lower control limit and below the upper control limit for each variable, then the recorded values of pH and ORP later in the cycle are used to determine sensor reliability. Process 386 makes use of the following paradigms of pH and ORP sensor behavior during the control cycle:

* Turn on acid pump.
  (a) pH should immediately decrease below 6;
  (b) ORP should immediately increase above 900 mV;
  (c) the AC voltage sensor across the acid pump shows voltage applied.
* Turn off the acid pump.
  (d) pH should rise to 7 or higher within seconds;
  (e) ORP should fall to 800 mV or lower within seconds;
  (f) the AC voltage sensor across the acid pump shows no voltage present.
* Turn on chlorine pump.
  (g) pH should immediately increase above 8;
  (h) the AC voltage sensor across the chlorine pump shows voltage applied.
* Turn off chlorine pump.
  (i) pH should fall below 8 within 45 seconds;
  (j) the AC voltage sensor across the chlorine pump shows no voltage present.

Process 386 evaluates the following truth table, where T=TRUE entries in a row are logically AND'ed together for a TRUE condition. Notice the pH and ORP sensors 76 and 78 provide three tests for the truth of Acid Feed OK. The two pump tests provide three tests for the truth of pH sensor OK, although the first condition verifying excursions of both algebraic signs is preferred.

|  | (a) | (b) | (c) | (d) | (e) | (f) | (g) | (h) | (i) | (j) |
|---|---|---|---|---|---|---|---|---|---|---|
| pH Sensor OK | T |  |  | T |  |  | T | | T | |
| or | T |  | T |  |  |  |  |  |  |  |
| or |  |  |  |  |  |  | T |  | T |  |
| ORP Sensor OK |  | T |  |  | T |  |  |  |  |  |
| Acid Feed OK | T | T | T | T | T | T |  |  |  |  |
| or | T |  | T | T |  | T |  |  |  |  |
| or |  | T | T |  | T | T |  |  |  |  |
| Chlorine Feed OK |  |  |  |  |  |  | T | T | T | T |

If process 386 detects a failure of a chemical pump or sensor, the control program executes process 396, which provides an execution trap. The modem 110 dials out to the remote terminal 108, and sends a message describing the failure. The time and date of failure are also included in the message.

If process 386 finds no failure, process 398 is activated which records in nonvolatile RAM 214 the time and date of the control cycle, pH, ORP, quantity of acid added, and quantity of chlorine added. This log is available for downloading via the modem to the remote terminal 108.

The automatic control cycle now restarts with a mixing delay T_cycle at process 370.

It should be appreciated that FIGS. 11A–D represent a simplified view of the logic and flow within the automatic mode cycle while retaining and presenting essential features and functions.

Figure 15:
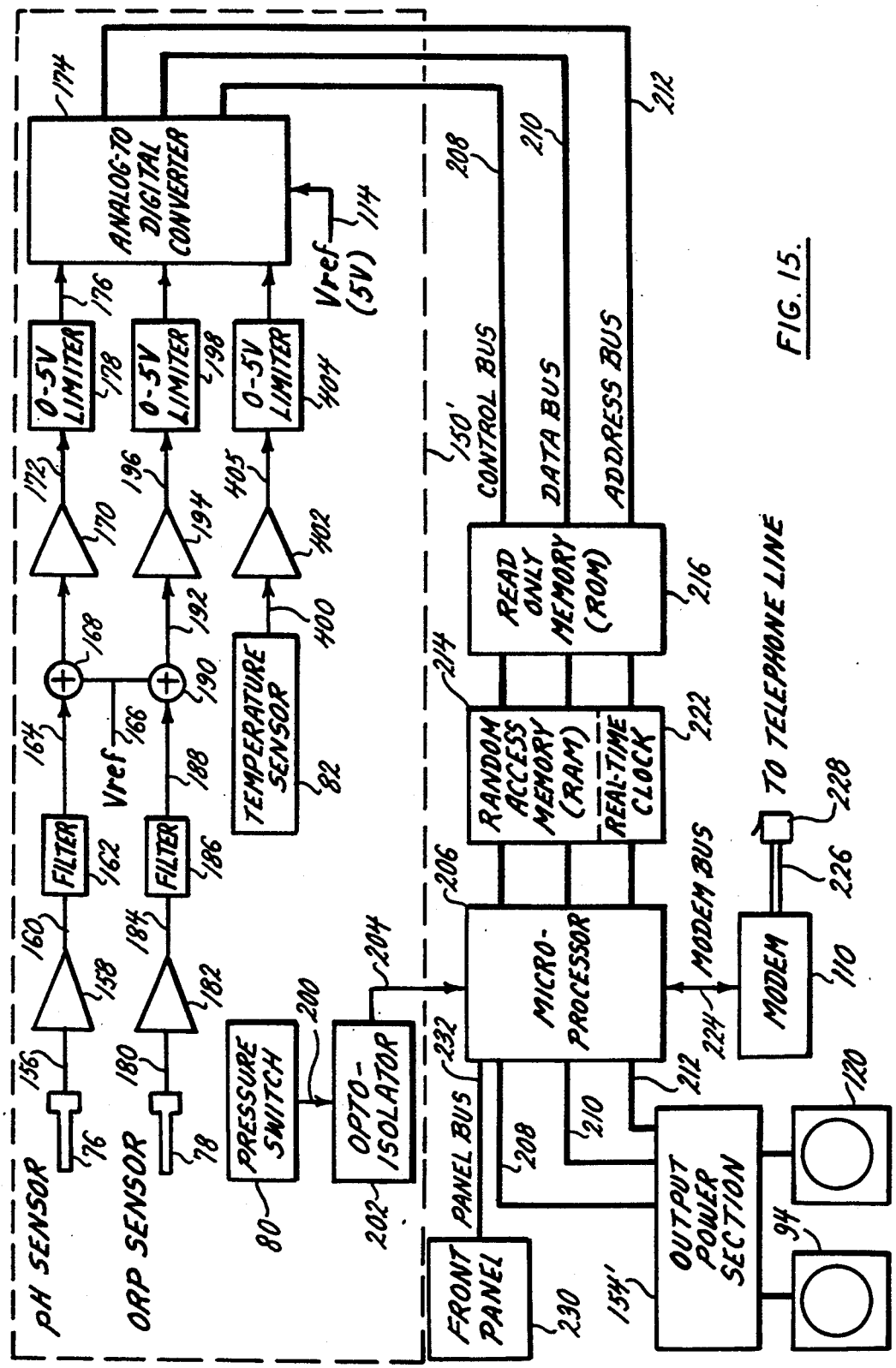
FIG. 15 is a block diagram of an alternate embodiment of the electronics of the present invention.

FIG. 15 shows an alternate embodiment of the electronics unit. It is similar to FIG. 6 except for the addition of temperature-sensing circuitry to the analog input section 150', and the connection of the output power section 154' to the control bus 208, data bus 210, and address bus 212. These modifications further enhance the operation of the automatic acid and chlorine control system 30.

Temperature sensor 82 is preferably an integrated circuit temperature sensor connected by shielded cable 400 to buffer and gain amplifier 402. Limiter 404 limits the output 405 of the amplifier 402 to 0 to 5VDC to prevent damage to the ADC 174.

Figure 16:
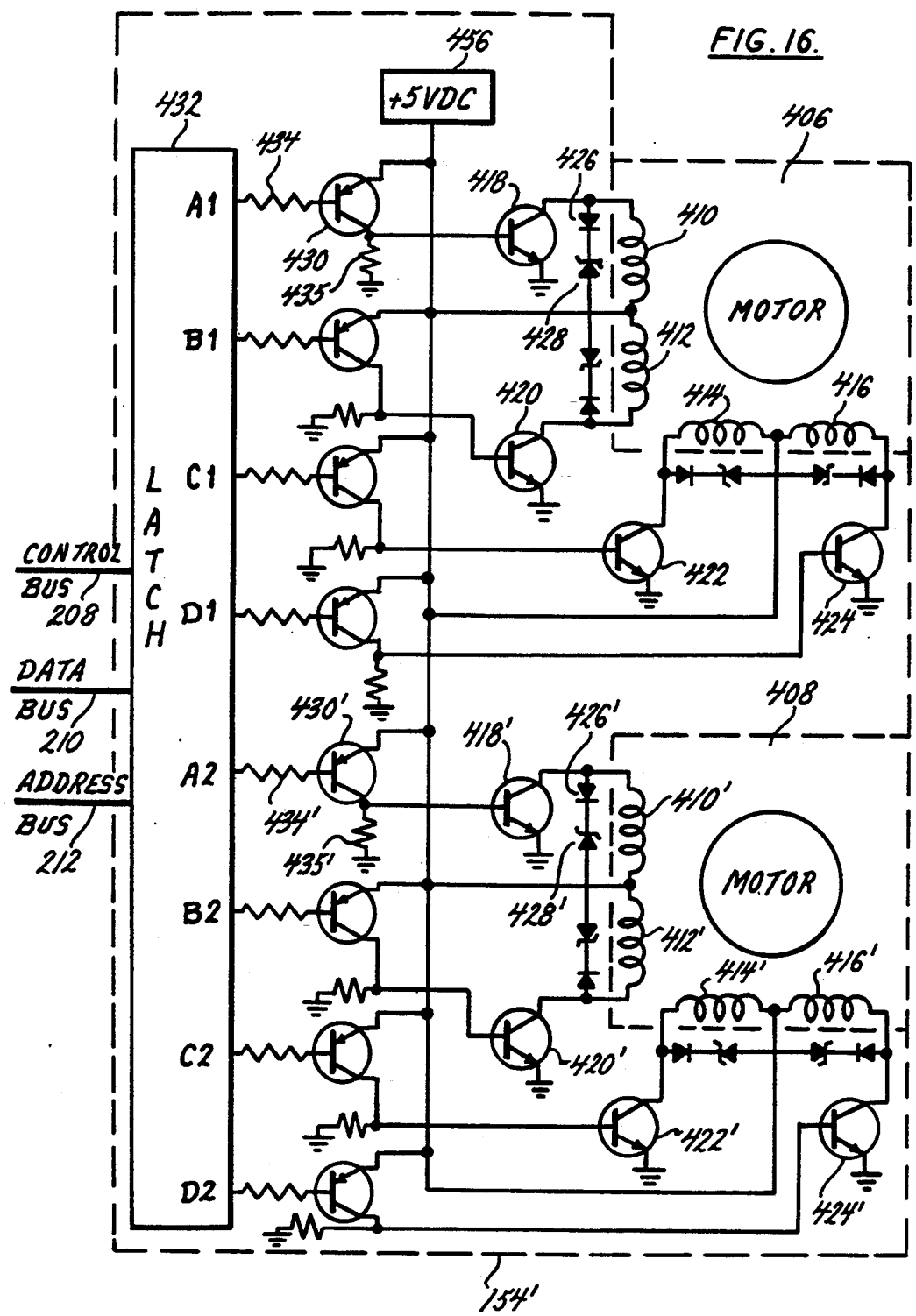
FIG. 16 is a schematic diagram showing details of the output power control section in FIG. 15.

FIG. 16 is a schematic diagram of the output power section 154' used in FIG. 15. This output power section 152' is designed to operate 5VDC stepping motors 406 and 408. The motors 406 and 408 replace the 120VAC motors 252 and 254 coupled to the acid and chlorine pumps 94 and 120 in FIG. 7. This embodiment 154' provides enhanced reliability and low-voltage operation of the automatic chemical monitor and control system 30.

Stepping motor operation in a chemical feed system offers several advantages over chemical pumps with AC motors or even low-voltage brush or brushless DC motors. Operating the chemical feed pumps from a 5VDC source eliminates all AC power handling by the controller 92. With only 5VDC outputs, the controller 92 can be powered by an external, wall-mount transformer (not shown) providing 5VDC and +/−12VDC. In another embodiment, a single 5VDC source can be used and with +/−12VDC being derived from a DC-DC converter. This low-voltage design also offers enhanced electrical safety and reliability over 120VAC implementations.

The design of the output power section 154 of FIG. 7 addressed the concern over a failure mode of AC power control relays allowing a pump motor to run-on, pumping chemicals into a pool until the supply was exhausted. This failure mode is overcome in this alternate embodiment 154', because a stepping motor with constant DC voltage applied does not rotate, it locks in place. A stepping motor's windings must be activated in a specific sequence to operate the motor. This feature provides a significant enhancement in system reliability. No power switch, relay, SSR, or power transistor failed-shorted can activate a chemical pump powered by a stepping motor.

FIG. 16 shows a schematic of the output power control unit 154' operating the two stepping motors 406 and 408 controlled directly by the microprocessor 206 through the control, data, and address buses 208, 210, and 212, respectively. Each stepping motor 406 or 408 is operated in a unipolar mode with two of its four windings 410, 412, 416 and 418 energized simultaneously. Both motors 406 or 408 operate in an identical but independent manner, and the components in the circuit of motor 408 corresponding to the circuit of motor 406 will be denoted by a prime ('). Associated with each motor are four NPN power transistors 418, 420, 422, and 424. For example, transistor 418 controls the voltage across winding 410. Also associated with winding 410 is a circuit comprising a rectifier 426 and zener diode 428 which allows current to decay quickly in winding 410. This enhances operation of the motor 406 and prevents damage to the NPN drive transistor 418. PNP transistor 430, which is controlled by an output pin of an 8-bit latch 432 through current-limiting resistor 434, drives transistor 418 from the voltage it produces across resistor 435. The circuit just described is typical of each winding of each motor.

The pattern of "1" and "0" bits written to 8-bit latch 434 via the control, data, and address buses 208, 210 and 212 determine which motor winding receives power. For example, an 8-bit word may be mapped into outputs "A1" through "D2" as follows:

| bit | 7 | 6 | 5 | 4 | 3 | 2 | 1 | 0 |
|---|---|---|---|---|---|---|---|---|
| | A1 | B1 | C1 | D1 | A2 | B2 | C2 | D2 |

If bit 7 ("A1") is at logical "0", transistors 430 and 418 conduct causing current to flow from a +5VDC supply 456 to flow through winding 410 and transistor 418 to ground. To operate the stepping motor 406, the windings must be activated in a specific sequence, two at a time. The rate at which a new sequence is presented to windings 410, 412, 414, and 416 determines the rotational speed of the stepping motor 406. Maximum speed limits as well as acceleration and deceleration rates must be considered to insure the motor 406 does not lose synchronization and chatter. These considerations insure that a random sequence of pulses to the motor's windings will not properly operate the stepping motor 406. This feature provides a measure of reliability against inadvertent motor operation by an out-of-control processor 206.

To rotate motor 406, the following bit patterns are written in sequence to 8-bit latch 432. Notice that the pattern on step #5 repeats the step #1 pattern and that bits 0–3, which operate motor 408, are unchanged.

| bit | 7 | 6 | 5 | 4 | 3 | 2 | 1 | 0 | |
|---|---|---|---|---|---|---|---|---|---|
| | 0 | 1 | 0 | 1 | 0 | 0 | 0 | 0 | step #1 |
| | 1 | 0 | 0 | 1 | 0 | 0 | 0 | 0 | step #2 |
| | 1 | 0 | 1 | 0 | 0 | 0 | 0 | 0 | step #3 |
| | 0 | 1 | 1 | 0 | 0 | 0 | 0 | 0 | step #4 |
| | 0 | 1 | 0 | 1 | 0 | 0 | 0 | 0 | step #5 |
| | ... | | | | | | | | ... |

Figure 17:
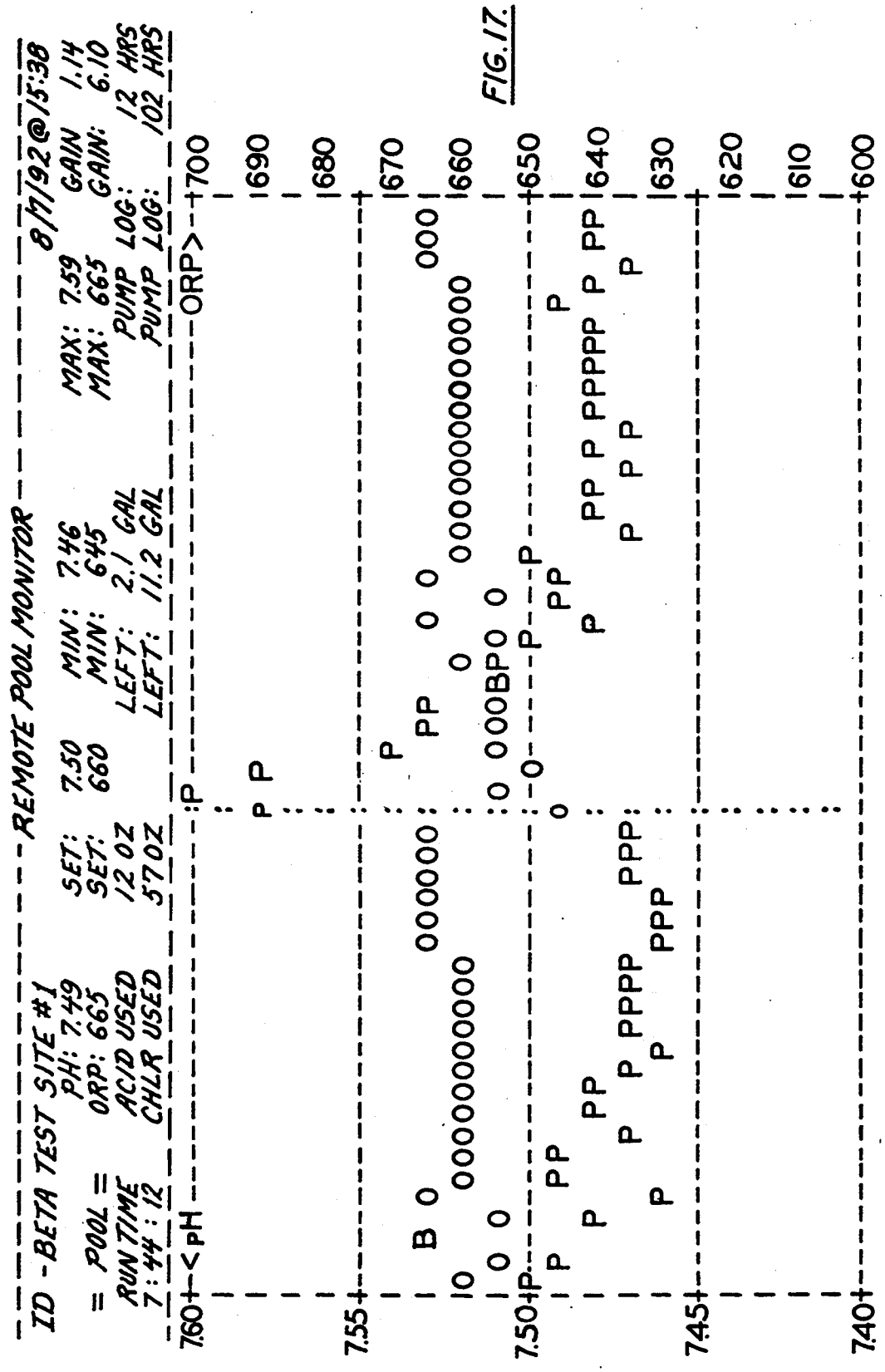
FIG. 17 is a representation of a pH and ORP control chart downloaded by the controller to a remote data terminal.

FIG. 17 is a representation of an actual report and control chart downloaded by the automatic chemical monitor and control system 30. This is obtained by dialing the controller 92, and typing an "R" after the modem 110 answers the incoming call. The current mode is suspended temporarily while the report is downloaded as shown in the flowchart of FIG. 12. In FIG. 17, the identification of the reporting control unit and the time and date of the inquiry are included in the report. Current readings for pH and ORP are presented as well as the time the recirculating pump has operated, the quantities of chemicals used and remaining, and the hours each chemical feed pump has operated since servicing.

Following that information, a control chart of pH and ORP measurements over the last 50 control cycles is presented. The ORP value is denoted by "O" and pH by "P". A "B" is a point where the curves overlay each other. When in spa mode, lowercase symbols are used. The vertical line of colons (":") indicates when a new control cycle started. This occurs whenever the recirculating pump 50 has come on after being off, or the automatic mode is reentered after a request through the modem 110 or by a front panel 230 operation.

FIG. 17 shows a new cycle starting with automatic switchover from spa to pool mode using the detection logic previously discussed.

The control cycle process log may contain data from the last 500 automatic mode control cycles and is stored in nonvolatile RAM 214. The log is essentially a circular buffer where, when full, the oldest record is replaced by the newest. The log records the time and date of each control cycle, the recirculating pump run time in minutes, the pH and ORP measurements, the ounces of acid and liquid chlorine added on that cycle and pool or spa mode. In the downloaded log, these values are presented along with the identification of the reporting control unit and the time and date of the inquiry. Pool mode is indicated by a "P" and "S" indicates spa mode. Data fields are delimited by commas facilitating analysis of logged data in a personal computer spreadsheet program. The log has a tamper-proof feature which will be explained in the discussion of the user control panel menu to follow. The log may be downloaded by typing "L" after the modem 110 answers the incoming call. The current mode is suspended temporarily while the report is downloaded as shown in flow chart of FIG. 12.

record new configuration data in nonvolatile RAM 214. It also supports superuser access to modify configuration variables invisible to the user control panel. The time at which the control panel menu is accessed is stamped at the upper left along with an identifier of the control unit at the upper right. This aids in tracking what changes were made to which control unit in the field if the user is logging the session during telecommunication. A user can access only those variables and functions preceded by a number in brackets. This allows a hierarchy of access appropriate to the knowledge and responsibility of the user. Access may be changed at any time by a superuser using a sequence of passwords. Access may be enabled/disabled to items individually, all together, or in predefined groups appropriate to different user levels. For example, in FIG. 18, this user can change nominal pH and ORP values as well as daily limits on chemical addition and update the supplies. The user can view but not change other parameters, cannot reset logs for the control cycle data and chemical pumps, and cannot execute modes other than the "SEN-

|  |  |  | [User Control Panel] |  |  |
|---|---|---|---|---|---|
| — | | 12/02/92 at 10:42 | | ID: Test_Installation #2 | |
| POOL | pH> | [0] nom: 7.50 | min: 7.20 | max: 7.80 | Gain: 1.0 |
| | ORP> | [4] nom: 675 | min: 550 | max: 700 | Gain: 6.0 |
| | | volume: | 80.0 Kgal | [9] degrees F.: | 77 |
| | | mix time: | 120 minutes | subcycles: | 8 |
| — | | [12] Daily Acid < 1.6 gal | | [13] Daily Chlor < 8.0 gal | |
| SPA | pH> | [14] nom: 7.50 | min: 7.20 | max: 7.80 | Gain: 1.0 |
| | ORP> | [18] nom: 660 | min: 550 | max: 700 | Gain: 5.0 |
| | | volume: | 800 gal | [23] degrees F.: | 102 |
| | | mix time: | 15 minutes | subcycles: | 1 |
| — | | [26] Daily Acid < 6 oz. | | [27] Daily Chlor < 12 oz. | |
| System | | Autoprime (0-OFF 1-ON): 1 | | (0-spa 1-Pool 2-Auto): 1 | |
| Values | | pH calibration: +0.00 | | <<USE DEFAULT VALUES>> | |
| | | [32] Acid Supply: 15.0 gal | | [33] Chlor Supply: 50.0 gal | |
| | | Acid Pump: 49.0 gal/day | | Chlor Pump: 96.0 gal/day | |
| | | Dialout #:5551212 | | Notify 0-NO 1-ID 2-Rept): 0 | |
| | | <<Reset CHEM Pump Logs>> | | <<Reset Control Log>> | |
| Mode | | ←STOP→ | | ←PRIME & RUN→ | |
| Select | | ←MANUAL→ | | ←SENSOR/PUMP TEST→ | |

The above shows the user control panel menu used in teleservicing the automatic chemical monitor and controller 92. This menu contains the control cycle configuration variables stored in nonvolatile RAM 214. This menu may be obtained by typing "*" when after the modem 110 answers the incoming call. As shown in FIG. 12, the currently-active mode is suspended and a password is requested. If the password is invalid, the mode is resumed. If the password is valid, the download mode is executed. The function of the download mode is to manage user inputs to the control panel and to SOR/PUMP TEST" and "RUN", the automatic mode. In this installation, the control cycle log is secure and tamper-proof. This insures integrity of this data for monitoring by Health Departments and other regulatory agencies.

| Pumping TIME | Chlr pH | TEST MODE (5 sec) ORP | Starting with pH = 7.53 Press <RETURN> to STOP Press <RETURN> to STOP | opr = 655 Pumping TIME | Acid pH | (5 sec) ORP | Press <RETURN> to STOP Press <RETURN> to STOP |
|---|---|---|---|---|---|---|---|
| 0, | 8.00, | 655, | | 0, | 6.73, | 900 | |
| 2, | 8.00, | 655, | | 2, | 6.73, | 900 | |
| 5, | 8.00, | 655, | | 5, | 6.73, | 895 | |
| 8, | 8.00, | 655, | | 8, | 6.73, | 900 | |
| 10, | 8.00, | 655, | | 10, | 6.73, | 855 | |
| 13, | 7.94, | 650, | | 13, | 6.73, | 880 | |
| 15, | 7.86, | 655, | | 16, | 6.73, | 895 | |
| 18, | 7.84, | 655, | | 18, | 6.73, | 900 | |
| 21, | 7.82, | 655, | | 21, | 6.73, | 900 | |
| 23, | 7.82, | 660, | | 23, | 6.73, | 810 | |
| 26, | 7.70, | 655, | | 26, | 6.73, | 735 | |
| 29, | 7.75, | 655, | | 29, | 6.83, | 790 | |

The above is a representation of the sensor/pump test mode data downloaded by the controller to a remote data terminal. It shows the result of running the "SENSOR/PUMP TEST" by entering "43" at the prompt in the user control panel menu of FIG. 20. The test can only be performed if the recirculating pump 50 is operating. Initial readings of pH and ORP in the manifold 74 are made and displayed. The chlorine pump 120 is operated for 5 seconds. At any time, the test can be aborted by pressing the Return Key on the remote computer terminal 108. The chlorine pump 120 is shut off and manifold 74 is flushed for 30 seconds. During this flush, time, pH, and ORP readings are taken and displayed. Notice that ORP is not affected at all by the chlorine injection, since ORP sensor 76 is upstream of chlorine injection port 102 in the manifold 74. pH, however, exceeds the system upper measurement limit of pH 8.0, and after 13 seconds is less than 8.0. The acid pump 94 is operated for 5 seconds, followed by another 30 second flush cycle. Notice that the pH reading is below the lower pH measurement limit and ORP is above the upper ORP measurement limit. The pH sensor is in range after 29 seconds and the ORP reading is below 800 mV after 23 seconds. These responses are typical of a normally-operating system in terms of both magnitude and speed-of-response.

The invention has been described with reference to preferred embodiments. Obviously, modifications and alterations will occur upon a reading and understanding of the specification. It is our intention to include all such modifications and alterations insofar as they come within the scope of the appended claims or the equivalents thereof.

We claim:

1. A monitoring and controlling system for a reservoir of water that has a recirculation system for recirculating the water in the reservoir, said monitoring and controlling system including:
   a service loop positioned in the recirculation system to bypass a portion of the water flowing therethrough, said service loop including:
   means to inject acid into the water flowing in said service loop;
   a pH sensor positioned downstream of said means to inject acid to produce a signal representative of the pH of water flowing there past;
   means to inject halogen as a bactericide into the water flowing in said service loop positioned downstream of said means to inject acid; and
   an oxygen reduction potential sensor positioned downstream of said means to inject acid and upstream of said means to inject halogen, to produce a signal representative of the oxygen reduction potential of the flow of water out of said service loop; and
   means to sense flow of water through said service loop and to produce a signal representative of the existence of flow of water through said service loop.

2. The monitoring and controlling system as defined in claim 1 wherein said service loop is sized and shaped to assure turbulent mixing flow in said service loop at least downstream of said means to inject acid.

3. The monitoring and controlling system as defined in claim 2 wherein said means to inject halogen include:
   a portion that extends into the flowing water, and wherein said pH sensor, said oxygen reduction potential sensor and said means to inject halogen are spaced in said service loop downstream from said means to inject acid a distance that assures that said turbulent mixing flow mixes acid injected into the water by said means to inject acid to assure that the acid cleans said pH and oxygen reduction potential sensors and at least said portion that extends into the flowing water of said means to inject halogen.

4. The monitoring and controlling system as defined in claim 3 wherein said means to sense flow of water through said service loop include:
   a pressure sensor positioned to sense water pressure in said service loop.

5. The monitoring and controlling system as defined in claim 3 further including:
   a temperature sensor positioned in said service loop to sense the temperature of water flowing therein and to produce a signal representative thereof.

6. The monitoring and controlling system as defined in claim 5 wherein said service loop is positioned to bypass water around a pressure drop in the recirculation system.

7. The monitoring and controlling system as defined in claim 5 wherein said means to inject acid include:
   an acid supply in liquid form;
   a liquid acid injector in fluid connection with said service loop;
   means to move said liquid acid from said acid supply to said service loop through said liquid acid injector, and wherein said means to inject halogen include:
   a halogen supply generally in a flowable form;
   a halogen injector in fluid connection with said service loop;
   means to move said halogen from said halogen supply to said service loop through said halogen injector, said monitoring and controlling system further including: computer control means responsive to said signals representative of water flow, water temperature, pH, and oxygen reduction potential connected to and controlling said means to move liquid acid and halogen to thereby maintain a bactericide activity range in the reservoir.

8. The monitoring and controlling system as defined in claim 7 wherein said means to sense flow of water through said service loop include:
   a pressure sensor, and wherein said pressure and temperature sensors include:
   sensing portions in said service loop upstream of said liquid acid injector.

9. The monitoring and controlling system as defined in claim 3 wherein said means to inject acid include:
   an acid supply in liquid form;
   a liquid acid injector in fluid connection with said service loop; and
   means to move said liquid acid from said acid supply to said service loop through said liquid acid injector, and wherein said means to inject halogen include:
   a halogen supply generally in a flowable form;
   a halogen injector in fluid connection with said service loop; and
     means to move said halogen from said halogen supply to said service loop through said halogen injector, said monitoring and controlling system further including:
   computer control means responsive to said signals representative of water flow, pH, and oxygen reduction potential connected to and controlling said means to move liquid acid and halogen to thereby maintain a bactericide activity range in the reservoir.

10. The monitoring and controlling system as defined in claim 9 wherein said computer control means include:
 a power section including:
  a connection to electrical power;
  first switch means to controllably energize said means to move acid with electrical power;
  second switch means to controllably energize said means to move halogen with electrical power; and
  an electromechanical relay connected to disconnect electrical power from said means to move acid and said means to move halogen under control of said computer control means.

11. The monitoring and controlling system as defined in claim 10 wherein said means to move acid include:
 a first electric motor adapted for energizing with alternating current electrical power; and
 an acid pump connected to be driven by said first electric motor, wherein said means to move halogen include:
 a second electric motor adapted for energizing with alternating current electrical power; and
 a halogen pump connected to be driven by said second electric motor, wherein said power section further includes:
 acid pump signal means connected across said first electric motor to produce to said computer control means a acid pump signal indicating that said first electric motor is energized; and
 halogen pump signal means connected across said second electric motor to produce to said computer control means a halogen pump signal indicating that said second electric motor is energized, wherein said electromechanical relay is a normally closed electromechanical relay, and wherein said computer control means include:
 logic means to energize said normally closed electromechanical relay to disconnect alternating current electrical power from said first and second electric motors when said logic means determines that an error condition exists in said monitoring and controlling system.

12. The monitoring and controlling system as defined in claim 9 wherein said computer control means include:
 logic means to prevent any liquid acid and halogen that has not passed through the reservoir from being present in said service loop at the same time.

13. The monitoring and controlling system as defined in claim 9 wherein said computer control means include:
 a power section including:
  a connection to low voltage direct current power;
  first switch means to controllably energize said means to move acid with the low voltage direct current in response to digital signals from said computer control means;
  halogen switch means to controllably energize said meads to move halogen with the low voltage direct current in response to digital signals from said computer control means.

14. The monitoring and controlling system as defined in claim 13 wherein said means to move acid include:
 a first stepping motor adapted for energizing with first pulse sequences of the low voltage direct current; and
 an acid pump connected to be driven by said first electric motor, wherein said means to move halogen include:
 a second stepping motor adapted for energizing with second pulse sequences of the low voltage direct current; and
 a halogen pump connected to be driven by said second stepping motor, and wherein said computer control means include:
 logic means to produce said first and second pulse sequences at different times to prevent any acid and halogen that has not passed through the reservoir from being present in said service loop at the same time.

15. The monitoring and controlling system as defined in claim 9 wherein said computer control means include:
 memory means to store data concerning the amount of acid and halogen remaining in said acid supply and said halogen supply.

16. A water quality maintenance system for a reservoir of water that includes water recirculation means, said system including:
 a service loop positioned in the recirculation means so that said water recirculation means flow reservoir water therethrough, said service loop including:
  a water inlet connected to the water recirculation means;
  a water outlet connected to the water recirculation means;
  a first sensor to produce a signal representative of the pH of water at said water outlet of said service loop;
  means to decrease the pH of water flowing in said service loop;
  means to inject bactericide into the water flowing in said service loop; and
  a second sensor positioned upstream from said means to inject bactericide, which produces a signal representative of the concentration of bactericide in the water in said service loop; and
  means to sense flow of water in the water recirculation means to produce a signal representative of the existence of a flow rate through said service loop.

17. The water quality maintenance system as defined in claim 16 wherein said service loop is sized and shaped to assure turbulent mixing flow in said service loop at least downstream of said means to decrease the pH of water flowing in said service loop.

18. The water quality maintenance system as defined in claim 17 wherein said first sensor, said second sensor and said means to inject bactericide are spaced downstream in said service loop from said means to decrease the pH.

19. The water quality maintenance system as defined in claim 18 wherein said means to sense flow of water include:
 a pressure sensor positioned to sense water pressure in said service loop.

20. The water quality maintenance system as defined in claim 18 wherein said means to sense flow of water include:
 a flow sensor positioned in said service loop.

21. The water quality maintenance system as defined in claim 18 further including:
 a temperature sensor positioned in said service loop to sense the temperature of water flowing in said service loop and to produce a signal representative thereof.

22. The water quality maintenance system as defined in claim 21 wherein the water recirculation means include:
a heat exchanger, said service loop being positioned in the water recirculation means to bypass water around the heat exchanger.

23. The water quality maintenance system as defined in claim 21 wherein said means to decrease the pH include:
an acid supply;
an acid injector connected to inject acid into said service loop;
means to feed acid from said acid supply into water in said service loop through said acid injector, and wherein said means to inject bactericide include:
a sodium hypochlorite supply;
a sodium hypochlorite injector connected to inject sodium hypochlorite into said service loop;
means to feed said sodium hypochlorite from said sodium hypochlorite supply to said service loop through said sodium hypochlorite injector, said water quality maintenance system further including:
computer control means responsive to said signals representative of water flow, water temperature, pH, and concentration of bactericide connected to and controlling said means to feed acid and sodium hypochlorite to thereby maintain a bactericidal activity range in the reservoir.

24. The water quality maintenance system as defined in claim 21 wherein said means to decrease the pH include:
an acid supply;
an acid injector connected to inject acid into said service loop;
means to move acid from said acid supply into water in said service loop through said acid injector, and wherein said means to inject bactericide include:
a bactericide supply;
a bactericide injector connected to inject bactericide into said service loop;
means to move bactericide from said bactericide supply to said service loop through said bactericide injector, said water quality maintenance system further including:
computer control means responsive to said signals representative of water flow, water temperature, pH, and concentration of bactericide connected to and controlling said means to move acid and bactericide to thereby maintain a bactericidal activity range in the reservoir.

25. The water quality maintenance system as defined in claim 24 wherein said bactericide supply contains bactericide whose bactericidal effectivity is sensitive to pH.

26. The water quality maintenance system as defined in claim 16 wherein said means to decrease the pH include:
an acid supply;
an acid injector connected to inject acid into said service loop;
means to move acid from said acid supply into water in said service loop through said acid injector, and wherein said means to inject bactericide include:
a bactericidal halogen supply;
a bactericidal halogen injector connected to inject bactericidal halogen into said service loop; and
means to move said bactericidal halogen from said bactericidal halogen supply into water in said service loop through said bactericidal halogen injector, said water quality maintenance system further including:
computer control means responsive to said signals representative of water flow, pH, and concentration of bactericide connected to and controlling said means to move acid and bactericidal halogen to thereby maintain a bactericidal activity range in the reservoir.

27. The water quality maintenance system as defined in claim 26 wherein said computer control means include:
a power section including:
a connection to electric power;
first switch means to controllably energize said means to move acid with electric power;
second switch means to controllably energize said means to move bactericidal halogen with electrical power; and
an electromechanical relay connected to disconnect electrical power from said means to move acid and said means to move bactericidal halogen under control of said computer control means.

28. The water quality maintenance system as defined in claim 27 wherein said electromechanical relay is a normally closed electromechanical relay that is energized by said computer control means upon fault conditions to disconnect electrical power from said means to move acid and said means to move bactericidal halogen.

29. The water quality maintenance system as defined in claim 27 wherein said means to move acid include:
a first electric motor; and
an acid pump connected to be driven by said first electric motor, wherein said means to move bactericidal halogen include:
a second electric motor; and
a halogen pump connected to be driven by said second electric motor, wherein said power section further includes:
acid pump signal means connected across said first electric motor to produce to said computer control means a acid pump signal indicating that said first electric motor is energized; and
halogen pump signal means connected across said second electric motor to produce to said computer control means a halogen pump signal indicating that said second electric motor is energized, and wherein said computer control means include:
logic means to control said electromechanical relay to disconnect electrical power from said first and second electric motors when said logic means determines signals indicating a faulty condition have been received by said computer control means.

30. The water quality maintenance system as defined in claim 26 wherein said computer control means include:
logic means to prevent any acid and bactericidal halogen from being present in said service loop at the same time in water that has not passed through the reservoir.

31. The water quality maintenance system as defined in claim 26 wherein said computer control means include:

a power section including:
  a connection to low voltage direct current power;
  first switch means to controllably energize said means to move acid with the low voltage direct current in response to digital signals from said computer control means; and
  second switch means to controllably-energize said means to move bactericidal halogen with the low voltage direct current in response to digital signals from said computer control means.

32. The water quality maintenance system as defined in claim 31 wherein said means to move acid include:
  a first stepping motor adapted for energizing with first pulse sequences of the low voltage direct current; and
  an acid pump connected to be driven by said first stepping motor, wherein said means to move bactericidal halogen include:
  a second stepping motor adapted for energizing with second pulse sequences of the low voltage direct current; and
  a halogen pump connected to be driven by said second stepping motor, and wherein said computer control means include:
  logic means to produce said first and second pulse sequences at different times to prevent acid and bactericidal halogen from being pumped into said service loop at the same time.

33. A reservoir of water including:
  water quality maintenance means;
  a recirculation pump for recirculating water from said reservoir through said water quality maintenance means and back to said reservoir, said water quality maintenance means including:
    a service loop connected to the recirculation system so that at least a portion of the recirculating water passes therethrough, said service loop including:
      means to inject acid into the recirculating water in said service loop;
      a pH sensor positioned downstream of said means to inject acid to produce a signal representative of the pH of recirculating water thereat;
      means to inject bactericidal halogen into the recirculating water in said service loop positioned downstream of said means to inject acid; and
      an oxygen reduction potential sensor positioned downstream of said means to inject acid and upstream of said means to inject bactericidal halogen, to produce a signal representative of the oxygen reduction potential of the recirculating water thereat;
      means to sense flow of the recirculating water and to produce a flow signal representative of the existence of a quantity of flow of recirculating water through said service loop; and
    controller means connected to receive said signals representative of the pH, the oxygen reduction potential, and the existence of flow of recirculating water and to produce therefrom, an acid inject signal to said means to inject acid to cause said means to inject acid to inject acid into the recirculating water to maintain the pH of the reservoir water in a range, and a bactericidal halogen inject signal to said means to inject bactericidal halogen to cause said means to inject bactericidal halogen to inject bactericidal halogen into the recirculating water to maintain effectiveness of the bactericidal halogen in the reservoir water.

34. The reservoir of water as defined in claim 33 further including:
  a temperature sensor positioned to sense the temperature of water in said reservoir and to produce a signal representative of the temperature to said controller means, said controller means using said signal representative of the temperature to compensate said signals representative of the pH and the oxygen reduction potential for water temperature to thereby maintain a bactericidal activity range in said reservoir.

35. The reservoir of water as defined in claim 33 wherein said means to inject acid include:
  an acid supply;
  an acid injector connected to said service loop;
  means to pump said acid from said acid supply into the recirculating water in said service loop through said acid injector, said means to pump acid having sufficient flow rate capacity to significantly change the pH of the recirculating water at said pH sensor and said oxygen reduction potential sensor, and wherein said means to inject bactericidal halogen include:
  a bactericidal halogen supply;
  a bactericidal halogen injector connected to said service loop;
  means to pump said bactericidal halogen from said bactericidal halogen supply into the recirculating water in said service loop through said bactericidal halogen injector, said water quality maintenance means further including:
  computer control means connected to and controlling said means to pump acid and bactericidal halogen, said computer control means being responsive to said signals representative of existence of water flow, pH, and oxygen reduction potential to maintain a bactericide activity range in said reservoir by controlling said means to pump acid and bactericidal halogen to inject acid and bactericidal halogen into the recirculating water at different times.

36. The reservoir of water as defined in claim 35 wherein said means to pump acid and means to pump bactericidal halogen include:
  electric powered devices, and wherein said computer control means include:
  a power section including:
    a connection to electric power; and
    a normally closed electromechanical relay disconnecting said connection to electric power from said electric powered devices of said means to pump acid and means to pump bactericidal halogen when energized by said computer control means.

37. The reservoir of water as defined in claim 35 wherein said computer control means include:
  a power section including:
    a connection to low voltage direct current power;
    first switch means to controllably energize said means to pump acid with the low voltage direct current in response to digital signals from said computer control means;
    second switch means to controllably energize said means to pump bactericidal halogen with the low voltage direct current in response to digital signals from said computer control means.

38. The reservoir of water as defined in claim 37 wherein said means to pump acid include:
a first stepping motor adapted for energizing with first pulse sequences of the low voltage direct current; and
an acid pump connected to be driven by said first stepping motor, wherein said means to pump bactericidal halogen include:
a second stepping motor adapted for energizing with second pulse sequences of the low voltage direct current; and
a bactericidal halogen pump connected to be driven by said second stepping motor, and wherein said computer control means include:
logic means to produce said first and second pulse sequences at different times to prevent any acid and bactericidal halogen from being pumped into said service loop at the same time.

39. The reservoir of water as defined in claim 35 wherein said means to pump acid include:
a first electric motor adapted for energizing with alternating current; and
an acid pump connected to be driven by said first electric motor, wherein said means to pump bactericidal halogen include:
a second electric motor adapted for energizing with alternating current; and
a bactericidal halogen pump connected to be driven by said second electric motor, wherein said power section further includes:
acid pump signal means connected across said first electric motor to produce to said computer control means a acid pump signal indicating that said first electric motor is energized; and
bactericidal halogen pump signal means connected across said second electric motor to produce to said computer control means a bactericidal halogen pump signal indicating that said second electric motor is energized, and wherein said computer control means include:
a power section including:
a connection to alternating current; and
a normally closed electromechanical relay forming a portion of connections to alternating current for said first and second electric motors; and
logic means to energize said normally closed electromechanical relay to disconnect alternating current from said first and second electric motors when said logic means sense conditions of said water quality maintenance means.

40. The reservoir of water as defined in claim 35 wherein said reservoir includes:
a first water storage area having:
a first response to the addition of a first amount of chemical there into;
a second water storage area having:
a second response to the addition of an amount of chemical there into greater than said first response to the addition of the first amount of chemical;
valve means to switch said recirculation pump between recirculating water of said first water storage area and recirculating water of said second water storage area, said computer control means including:
first memory means storing:
data representative of said first and second responses;
a startup routine that:
causes the first amount of chemical to be injected into the recirculating water based on said second response;
measures the response of the recirculating water coming from said reservoir to such chemical injection;
determines the state of said valve means from the response of the recirculating water coming from said reservoir to such chemical injection in relation to said data representative of said first and second responses; and
adjusts said acid and halogen inject signals to maintain proper bactericidal effectiveness in said first water storage area when said valve means are determined to be recirculating water of said first water storage area.

41. The reservoir of water as defined in claim 40 wherein said computer control means further include:
a run routine that:
measures the response of the recirculating water coming from said reservoir to injection of chemical caused by said acid and halogen inject signals;
compares said response of the recirculating water coming from said reservoir to injection of chemical caused by said acid and halogen inject signals with said data representative of said first and second responses;
determines the state of said valve means from the response of the recirculating water coming from said reservoir to such chemical injection in relation to said data representative of said first and second responses; and
adjusts said acid and halogen inject signals to maintain proper bactericidal effectiveness in said second water storage area when said valve means are determined to be recirculating water of said second water storage area.

42. The reservoir of water as defined in claim wherein said computer control means further include:
second memory means including:
titration curves for the acid and bactericidal halogen; and
processor means that:
compute acid inject time from said determination of valve means state, said titration curves, the rate capacity of said means to pump acid, and the pH of the recirculating water from said reservoir, said computer control means causing injection of acid in accordance with said computation of acid inject time.

43. The reservoir of water as defined in claim 42 wherein said processor means:
computes bactericidal halogen inject time from said determination of valve means state, the titration curves, the rate capacity of said means to pump bactericidal halogen, the oxygen reduction potential and the pH of the recirculating water, said computer control means causing injection of bactericidal halogen in accordance with said computation of bactericidal halogen inject time.

44. The reservoir of water as defined in claim 43 wherein said computer control means:
determine the response of said reservoir of water to the injection of acid and bactercidal halogen;

adjust the acid and bactercidal halogen inject time in accordance with the response of said reservoir of water to the injection of acid and bactercidal halogen; and establish a delay between acid injection and bactericidal halogen injection.

45. The reservoir of water as defined in claim wherein said reservoir includes:
   a first water storage area having:
      a first water storage capacity;
   a second water storage area having:
      a second water storage capacity smaller than said first water storage area;
   valve means to switch said recirculation pump between recirculating water of said first water storage area and recirculating water of said second water storage area, said computer control means including:
   memory means including:
      data representative of the expected responses of said first and second water storage areas to the addition of chemical therein;
   a startup routine that:
      first determines that water is recirculating in said service loop before allowing injection of acid or bactericidal halogen;
      causes first amounts of acid and bactericidal halogen to be injected based on said second water storage capacity;
   measures the response to injection of the first amounts of acid and bactericidal halogen of the recirculating water;
   compares the measured response to injection of the first amounts of acid and bactericidal halogen of the recirculating water to:
      determine therefrom whether the injections of the first amounts of acid and bactericidal halogen took place from the response of said pH sensor thereto; and
      determine therefrom whether said pH and said oxygen reduction potential sensors are operating properly from the response thereof to the injection of the first amount of acid and bactericidal halogen;
   after a delay, compares the measured response to injection of the first amounts of acid and bactericidal halogen of the recirculating water to:
      determine therefrom the long term response of the recirculating water to injection of the first amounts of acid and bactericidal halogen and thereby determine the state of said valve means from the long term response of the recirculating water to the injection of the first amounts of acid and bactericidal halogen; and
   adjusts said acid and halogen inject signals to maintain proper bactericide effectiveness in said first water storage area when said valve means are determined to be recirculating water of said first water storage area.

46. The reservoir of water as defined in claim 45 wherein said data includes:
   volume parameters of said first and second water storage areas; and
   control parameters of said first and second water storage areas.

47. Water quality maintenance means for at least one reservoir of water open to biological contaminants that includes at least one water recirculation system, which recirculates water in the at least one reservoir, said water quality maintenance means including:
   sensor means connected to the at least one water recirculation system so that at least a portion of the recirculating water passes adjacent thereto, said sensor means including:
      means that produce a recirculation output signal when the at least one recirculation system is recirculating water;
      a pH sensor that produces an pH output signal representative of the pH of recirculating water thereat; and
      an oxygen reduction potential sensor that produces an ORP output signal representative of the oxygen reduction potential of the recirculating water thereat;
   chemical feed means connected to the at least one water recirculation system so that at least a portion of the recirculating water passes adjacent thereto, said chemical feed means including:
      an acid feed system to controllably feed acid into the recirculating water of the at least one water recirculation system; and
      a halogen feed system to controllably feed halogen into the recirculating water of the at least one water recirculation system; and
   controller means connected to receive said recirculation output signal, said pH output signal, and said ORP output signal and to produce therefrom, an acid feed signal to said acid feed system to cause said acid feed system to feed acid in the recirculation water to lower the pH of the water in the at least one reservoir to a first range, and a halogen feed signal to said halogen feed system to cause said halogen feed system to feed halogen in the recirculation water to raise the oxygen reduction potential of the water in the at least one reservoir to a second range, said sensor means further including:
      a temperature sensor that produces a temperature output signal representative of the temperature of the recirculating water thereat, said controller means using said temperature output signal to compensate said pH and ORP output signals for temperature.

48. The water quality maintenance means as defined in claim 47 wherein the at least one reservoir is a pool and a spa having different water volume capacities, said controller means using said temperature output signal to determine whether the pool or spa is having its water recirculated by the recirculation system and hence the water volume to be controlled.

49. The water quality maintenance means as defined in claim 47 wherein said halogen feed system controllably feeds chlorine in soluble form.

50. The water quality maintenance means as defined in claim 47 wherein said halogen feed system controllably feeds sodium hypochlorite.

51. Water quality maintenance means for at least one reservoir of water that includes at least one water recirculation system, which recirculates water in the at least one reservoir, said water quality maintenance means including:
   sensor means connected to the at least one water recirculation system so that at least a portion of the recirculating water passes adjacent thereto, said sensor means including:

means that produce a recirculation output signal when the at least one recirculation system is recirculating water;

a pH sensor that produces an pH output signal representative of the pH of recirculating water thereat; and an oxygen reduction potential sensor that produces an ORP output signal representative of the oxygen reduction potential of the recirculating water thereat;

chemical feed means connected to the at least one water recirculation system so that at least a portion of the recirculating water passes adjacent thereto, said chemical feed means including:

an acid feed system to controllably feed acid at a rate into the recirculating water of the at least one water recirculation system, said acid feed system including:

a supply of liquid acid;

an acid port positioned for feeding liquid acid into the recirculating water; and means to move said liquid acid from said supply of liquid acid into the recirculating water through said acid port, said acid port being spaced slightly upstream from said pH and oxygen reduction potential sensors, said means to move said liquid acid having sufficient rate capacity to substantially change the pH of the recirculating water at said pH sensor; and a halogen feed system to controllably feed halogen at a rate into the recirculating water of the at least one water recirculation system, said halogen feed system including:

a supply of liquid halogen;

a halogen port positioned for feeding liquid halogen into the recirculating water; and means to move said liquid halogen from said supply of liquid halogen into the recirculating water through said halogen port, said halogen port being spaced slightly upstream from said pH sensor and downstream from said oxygen reduction potential sensor, said means to move said liquid halogen having sufficient rate capacity to substantially change the pH of the recirculating water at said pH sensor; and controller means connected to receive said recirculation output signal, said pH output signal, and said ORP output signal and to produce therefrom, an acid feed signal to said acid feed system to cause said acid feed system to feed acid in the recirculation water for time sufficient to lower the pH of the water in the at least one reservoir to a range, and a halogen feed signal to said halogen feed system to cause said halogen feed system to feed halogen in the recirculation water for time sufficient to raise the oxygen reduction potential of the water in the at least one reservoir to a range.

52. The water quality maintenance means as defined in claim 51 wherein said computer control means include:

a power section including:

a connection to electrical power;

acid switch means to controllably energize said means to move said liquid acid with electrical power;

halogen switch means to controllably energize said means to move said liquid halogen with electric power; and an electromechanical relay controlled by said computer control means to disconnect electric power from said acid and halogen switch means for said acid and halogen switch means to apply to energize said means to move said liquid acid and said means to move said liquid halogen when commanded by said computer control means.

53. The water quality maintenance means as defined in claim 52 wherein said means to move said liquid acid include:

a first electric motor; and an acid pump connected to be driven by said first electric motor, wherein said means to move said liquid halogen include:

a second electric motor; and a halogen pump connected to be driven by said second electric motor, wherein said power section further includes:

acid pump signal means connected across said first electric motor to produce to said computer control means a acid pump signal indicating that said first electric motor is energized; and halogen pump signal means connected across said second electric motor to produce to said computer control means a halogen pump signal indicating that said second electric motor is energized, and wherein said computer control means include:

logic means to cause said computer control means to command said electromechanical relay to disconnect electrical power from said first and second electric motors when said logic means determine improper signals have been received by said computer control means.

54. The water quality maintenance means as defined in claim 51 wherein said computer control means include:

a power section including:

a connection to low voltage direct current power;

acid switch means to controllably energize said means to move said liquid acid with the low voltage direct current in response to digital signals from said computer control means; and halogen switch means to controllably energize said means to move said liquid halogen with the low voltage direct current in response to digital signals from said computer control means.

55. The water quality maintenance means as defined in claim 51 wherein said means to move said liquid acid include:

a first stepping motor adapted for energizing with first digital signals; and an acid pump connected to be driven by said first stepping motor, wherein said means to move said liquid halogen include:

a second stepping motor adapted for energizing with second pulses of the low voltage direct current; and a halogen pump connected to be driven by said second stepping motor, and wherein said computer control means include:

logic means to produce said first and second digital signals to said first and second stepping motors at different times to prevent said liquid acid and said liquid halogen from being fed at the same time.

56. The water quality maintenance means as defined in claim 51 wherein said computer control means include:

non-volatile memory means storing:

data representative of the expected response of the at least one reservoir of water to said acid feed signal;

a routine that:
  causes an amount of acid to be fed;
  measures the long term response of the recirculating water to such acid feed;
  determines whether the long term response of the recirculating water is consistent with the expected response of the at least one reservoir of water to said acid feed signal; and
  adjusts said acid feed signal to maintain proper pH in the at least one reservoir when the at least one reservoir responds differently than the expected response of the at least one reservoir of water stored in said non-volatile memory means.

57. The water quality maintenance means as defined in claim 56 wherein said non-volatile memory means stores:
  data representative of the expected response of the at least one reservoir of water to said halogen feed signal;
  a routine that:
    causes an amount of halogen to be fed;
    measures the long term response of the recirculating water to such halogen feed;
    determines whether the long term response of the recirculating water is consistent with the expected response of the at least one reservoir of water to said halogen feed signal; and
    adjusts said halogen feed signal to maintain proper bactericidal activity in the at least one reservoir when the at least one reservoir responds differently than the expected response of the at least one reservoir of water stored in said non-volatile memory means.

58. The water quality maintenance means as defined in claim 57 wherein said routine performs the additional steps of:
  updating said data representative of the expected response of the at least one reservoir of water to said acid feed signal stored in said non-volatile memory means when said routine adjusts said acid feed signal; and
  updating said data representative of the expected response of the at least one reservoir of water to said halogen feed signal stored in said non-volatile memory means when said routine adjusts said halogen feed signal.

59. The water quality maintenance means as defined in claim 56 wherein said computer control means further include:
  read only memory means including:
    permanent storage of the titration curve for the acid; and
  processor means that:
    compute acid feed signal from at least said data representative of the expected response of the at least one reservoir, the titration curve, the rate capacity of said means to move acid, and the pH of the recirculating water, said computer control means causing feeding of acid in accordance with said computation of said acid feed signal.

60. The water quality maintenance means as defined in claim 56 wherein said non-volatile memory means also store:
  at least one pH set point; and
  at least one oxygen reduction potential set point, said computer control means further include:
    read only memory means including:
      permanent storage of the titration curves for the acid and halogen; and
    processor means that:
      compute said acid feed signal from said data representative of the expected response of the at least one reservoir, the acid titration curve, the at least one pH set point, the rate capacity of said means to move acid, and the pH of the recirculating water, said computer control means causing feeding of acid in accordance with said computation of said acid feed signal; and
      compute said halogen feed signal from said data representative of the expected responses of the at least one reservoir, the halogen titration curve, the at least one oxygen reduction potential set point, the rate capacity of said means to move halogen, the pH of the recirculating water, and the oxygen reduction potential of the recirculating water, said computer control means causing feeding of halogen in accordance with said computation of said halogen feed signal.

61. The water quality maintenance means as defined in claim 60 wherein said computer control means establish delay between acid feed and halogen feed to prevent acid and halogen at relatively high concentrations from mixing together and undesirably reacting.

62. The water quality maintenance means as defined in claim 80 wherein said computer control means delay halogen feed after an acid feed until the pH sensed by said pH sensor is greater than a second pH.

63. The water quality maintenance means as defined in claim 62 wherein said second pH is at least as large as 6.8.

64. Means for controlling the bactericidal environment within a body of water that includes a recirculation system comprising:
  a first conduit in fluid communication with the recirculation system so that water flows therethrough;
  means for addition of acid to said flowing water;
  means for detecting the oxygen reduction potential in said flowing water downstream from said means for addition of acid;
  means for addition of halogen to said flowing water downstream from said means for addition of acid and said means for detecting the oxygen reduction potential;
  means for detecting the pH of said flowing water downstream from said means for addition of acid, said means for detecting the oxygen reduction potential, and said means for addition of halogen.

65. The means for controlling the bactericidal environment within a body of water as defined in claim 64 wherein said flowing water has a Reynolds number of at least 2000.

66. The means for controlling the bactericidal environment within a body of water as defined in claim 64 wherein said means for detecting the oxygen reduction potential and pH comprise electrochemical cells.

67. The means for controlling the bactericidal environment within a body of water as defined in claim 64 wherein said means for addition of halogen produces an HOCl concentration in the body of water.

68. The means for controlling the bactericidal environment within a body of water as defined in claim 64 further including:

means to detect said water flow; and computer control means responsive to said means to detect pH, oxygen reduction potential, and water flow and controlling said means for addition of acid and halogen so that acid and halogen is not added simultaneously and to maintain a bactericidal activity range in the body of water.

69. A method for controlling the chemical environment within a body of water comprising:

recirculating a portion of said body of water;

diverting a flow of the recirculating water;

detecting the existence of the diverted flow;

adding acid to the diverted flow for first time;

adding halogen to the diverted flow for second time at a time when acid is not being added;

detecting the oxygen reduction potential of the diverted flow when acid is being added thereto, and when acid is not being added thereto at a location upstream in the diverted flow from addition of halogen;

discharging said diverted flow back into the recirculating portion of said body of water;

detecting the pH of the diverted flow just prior to its discharge back into the recirculating portion when acid is being added thereto, when acid is not being added thereto, when halogen is being added thereto, and when halogen is not being added thereto;

controlling the addition of acid and halogen to maintain the chemical environment within the body of water in response to the detection of pH and oxygen reduction potential at times when existence of diverted flow is detected and acid and halogen are not being added thereto.

70. The method according to claim 69 wherein the halogen is added to the diverted flow just before the acid is added, whereby the acid acts as a cleaning agent for the halogen.

71. The method according to claim 69 wherein the pH level of said diverted flow downstream of where acid is added is maintained at values below 6.0 when acid is being added thereto.

72. An automatic system to maintain bactericidal action in a reservoir of water equipped with means for recirculating water, the automatic system including:

a first sensor responsive to pH;

a second sensor responsive to bactericidally effective halogen;

a service loop which bypasses a portion of the recirculating water past said first and second sensors;

acid injection means that on command inject acid upstream of said first and second sensors at a rate that establishes a first pH at least as low as a second pH at said first and second sensors when acid is being injected thereby;

halogen injection means that on command inject halogen upstream of said first sensor and downstream of said second sensor; and electronics means for determining the injection times of the acid and halogen needed to restore pH and bactericidally effective halogen to stored setpoints, and for controlling said acid and halogen injection means in response to said injection time determination.

73. The automatic system as defined in claim 72 wherein said second sensor is an oxygen reduction potential sensor and said second pH is at least as low as 6.0.

74. The automatic system as defined in claim 72 further including:

a display and input terminal; and telecommunication means for connecting said electronics means and said display and input terminal means, said electronics means reporting process control status to said display and input terminal and said display and input terminal, allowing modification of the process parameters of said electronics means, selection of operating modes of said electronics means, and performance of diagnostic tests on said automatic system.

75. The automatic system as defined in claim 72 further including:

a display and input terminal at a remote location; and telecommunication means for connecting said electronics means and said display and input terminal means, said electronics means reporting process parameters that are outside programmed limits.

76. The automatic system as defined in claim 72 further including:

a display and input terminal at a remote location; and telecommunication means for connecting said electronics means and said display and input terminal means, said electronics means reporting supply levels of acid and halogen by subtracting amounts of acid and halogen used from starting amounts thereof.

77. The automatic system as defined in claim 72 further including:

a display and input terminal at a remote location; and telecommunication means for connecting said electronics means and said display and input terminal means, said electronics means reporting historic data for process variables including date and time, pH and oxygen reduction potential levels and quantities of acid and halogen injected.

78. The automatic system as defined in claim 72 wherein said service loop is sized with respect to the recirculating water bypassed therethrough to keep the Reynolds Number of the water recirculating therein greater than 2000.

79. The automatic system as defined in claim 72 wherein said electronics unit includes:

logic means to determine the operability of said first and second sensors.

80. Means for controlling the chemical environment within a body of water that includes a recirculation system comprising:

a first conduit forming a portion of the recirculation system;

a second conduit connected in parallel to said first conduit sized so that water flows turbulently therethrough;

means for addition of acid to said turbulent water in said second conduit;

means for detecting a representation of the level of base in said turbulent water downstream from said means for addition of acid;

means for addition of base to said turbulent water downstream from said means for addition of acid and said means for detecting the level of base;

means for detecting the pH level of said turbulent water downstream from said means for addition of acid.

81. Means for controlling the chemical environment within a body of water as defined in claim 80 that further include:

electronic means for receiving inputs from said means for detecting a representation of the level of base and means for detecting the pH level of said turbulent water downstream from said means for addition of acid and producing control signals to said means for addition of acid and means for addition of base in response to said inputs.

82. Means for controlling the chemical environment within a body of water as defined in claim 81 that further include:
terminal means having:
display means; and
user interface means;
communications means capable of connecting said electronic means to said terminal means, whereby actions of said means for controlling the chemical environment within a body of water can be displayed on said display means, and a user can change operating parameters of said electronic means through said user interface means.

83. Means for controlling the chemical environment within a body of water as defined in claim 82 wherein said electronics means include:
means to adapt to environmental factors acting on the body of water by producing control signals to said means for addition of acid and means for addition of base in response to such environmental factors.

84. Means for controlling the chemical environment within a body of water as defined in claim 82 wherein said electronics means include:
means to adapt to environmental factors acting on the body of water by producing control signals to said means for addition of acid and means for addition of base in response to such environmental factors.

85. Means for controlling the chemical environment within a body of water as defined in claim 82 wherein said electronics means include:
memory means having stored therein:
amounts and time of addition of acid;
amounts and time of addition of base;
detected response to addition of acid; and
detected response to addition of base, said communications means providing such contents of said memory means to said terminal means.

86. Means for controlling the chemical environment within a body of water as defined in claim 85 wherein said memory means in addition have stored therein:
a daily maximum of acid; and
a daily maximum of base, said electronics means comparing said amounts of added acid and base and preventing more than said daily maximum of either from being added to the body of water, said daily maximum amounts being changable from said terminal means through use of said communication means.

87. Means for controlling the chemical environment within a body of water as defined in claim 82 wherein said electronics means include:
startup routine that:
signals said means for addition of acid to add acid;
detects if addition of acid occurs;
if acid addition does not occur, signals said means for addition of acid to add acid for a setable number of times;
if acid addition occurs, signals said means for addition of base to add base;
detects if addition of base occurs;
if base addition does not occur, restarts startup routine for a plurality of times; and
ends startup routine.

* * * * *